United States Patent
Biegalski et al.

(10) Patent No.: US 12,467,831 B2
(45) Date of Patent: Nov. 11, 2025

(54) MOLTEN SALT SAMPLING SYSTEM AND METHODS OF USE THEREOF

(71) Applicant: GEORGIA TECH RESEARCH CORPORATION, Atlanta, GA (US)

(72) Inventors: Steven R. Biegalski, Atlanta, GA (US); Peter William Sobel, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 356 days.

(21) Appl. No.: 18/056,883

(22) Filed: Nov. 18, 2022

(65) Prior Publication Data
US 2024/0167919 A1    May 23, 2024

(51) Int. Cl.
  *G01N 1/14*  (2006.01)
  *G21C 17/06*  (2006.01)
  *G01N 1/10*  (2006.01)

(52) U.S. Cl.
  CPC .............. *G01N 1/14* (2013.01); *G21C 17/06* (2013.01); *G01N 2001/1037* (2013.01)

(58) Field of Classification Search
  CPC .... G01N 1/14; G01N 2001/1037; G01N 1/12; G21C 17/06; G21C 17/022
  USPC ... 73/61.59, 863.81, 863.83, 863.84, 863.85, 73/863.86
  See application file for complete search history.

(56) References Cited

U.S. PATENT DOCUMENTS

| | | |
|---|---|---|
| 3,521,959 A | 7/1970 | Fassel et al. |
| 4,005,178 A | 1/1977 | LeBlanc |
| 4,454,774 A * | 6/1984 | Pridgen ................... G01N 1/10 205/411 |
| 4,539,846 A | 9/1985 | Grossman |
| 4,783,997 A | 11/1988 | Lynnworth |
| 6,125,912 A | 10/2000 | Branagan et al. |
| 6,143,431 A | 11/2000 | Webster |

(Continued)

FOREIGN PATENT DOCUMENTS

| | | |
|---|---|---|
| CA | 3179052 | 11/2021 |
| CN | 102795601 | 11/2012 |

(Continued)

OTHER PUBLICATIONS

Hoyt, N. et al. "Online Monitoring of Molten Salt Reactors," Argonne National Laboratory (2019).

(Continued)

*Primary Examiner* — Robert R Raevis
(74) *Attorney, Agent, or Firm* — King & Spalding LLP

(57) ABSTRACT

The salt sampling system may be utilized to collect molten fuel salt samples from a molten salt reactor. The salt sampling system keeps the fuel salt isolated from the environment outside the molten salt reactor system, until the salt sampling system is utilized to collect the salt sample. The salt sampling system may utilize one or more isolation components to position a collection assembly within the reactor system to collect the salt sample, and upon removing the collection assembly from the reactor system, closing the one or more isolation components so that the reactor system is once again isolated. The salt sampling system may additionally utilize a purge gas system and a vacuum system to remove unwanted contaminants from the components in fluid connection within salt sampling system prior to inserting the collection assembly into the molten salt reactor system.

11 Claims, 22 Drawing Sheets

(56) References Cited

U.S. PATENT DOCUMENTS

| | | |
|---|---|---|
| 6,258,185 B1 | 7/2001 | Branagan et al. |
| 6,318,192 B1 | 11/2001 | Carbone |
| 6,490,927 B2 | 12/2002 | Braunling et al. |
| 6,699,455 B2 | 3/2004 | Bulan et al. |
| 6,710,335 B2 | 3/2004 | Ellson et al. |
| 6,841,140 B2 | 1/2005 | Nishmimura et al. |
| 6,983,654 B2 | 1/2006 | Balin |
| 7,011,736 B1 | 3/2006 | Miller et al. |
| 7,322,251 B2 | 1/2008 | Gysling et al. |
| 7,960,581 B2 | 6/2011 | Vreede et al. |
| 8,636,892 B2 | 1/2014 | Koehl et al. |
| 8,642,954 B2 | 2/2014 | Ivaldi et al. |
| 8,746,440 B2 | 6/2014 | Williamson et al. |
| 8,771,482 B2 | 7/2014 | Bailey et al. |
| 8,900,439 B2 | 12/2014 | Wiedmeyer et al. |
| 8,956,524 B2 | 2/2015 | Wiedmeyer et al. |
| 8,968,547 B2 | 3/2015 | Loewen et al. |
| 9,017,527 B2 | 4/2015 | Wiedmeyer et al. |
| 9,150,975 B2 | 10/2015 | Berger et al. |
| 9,287,099 B2 | 3/2016 | Otsuka et al. |
| 9,295,923 B2 | 3/2016 | Mezheritsky et al. |
| 9,299,464 B2 | 3/2016 | Venneri |
| 9,305,673 B2 | 4/2016 | Heinold et al. |
| 9,347,807 B2 | 5/2016 | Ao |
| 9,475,706 B2 | 10/2016 | Policke et al. |
| 9,620,248 B2 | 4/2017 | Venneri |
| 9,638,607 B1 | 5/2017 | Hawthorne et al. |
| 9,847,149 B2 | 12/2017 | Spoerke et al. |
| 9,941,025 B2 | 4/2018 | Ahlfeld et al. |
| 9,968,899 B1 | 5/2018 | Gellaboina |
| 10,032,528 B2 | 7/2018 | Venneri |
| 10,056,160 B2 | 8/2018 | LeBlanc |
| 10,109,378 B2 | 10/2018 | Snead |
| 10,109,382 B2 | 10/2018 | Hackett et al. |
| 10,141,079 B2 | 11/2018 | Czerwinski et al. |
| 10,221,499 B2 | 3/2019 | Miller et al. |
| 10,280,527 B2 | 5/2019 | Loewen et al. |
| 10,317,262 B2 | 6/2019 | Kippersund |
| 10,416,045 B2 * | 9/2019 | Launiere .................. C25C 3/34 |
| 10,438,705 B2 | 10/2019 | Cheatham, III |
| 10,475,543 B2 | 11/2019 | Venneri |
| 10,566,096 B2 | 2/2020 | Czerwinski |
| 10,573,416 B2 | 2/2020 | Venneri |
| 10,685,750 B2 | 6/2020 | Eichel et al. |
| 10,830,689 B2 | 11/2020 | Hedtke |
| 10,878,971 B2 | 12/2020 | Venneri |
| 11,101,048 B2 | 8/2021 | Venneri |
| 11,136,245 B2 | 10/2021 | Benson |
| 11,170,901 B2 | 11/2021 | Cheatham, III |
| 11,189,383 B2 | 11/2021 | Snead |
| 11,200,991 B2 | 12/2021 | LeBlanc |
| 11,226,281 B1 | 1/2022 | Findikoglu et al. |
| 11,276,503 B2 | 3/2022 | Cisneros |
| 11,286,172 B2 | 3/2022 | William et al. |
| 11,373,765 B2 | 6/2022 | Czerwinski |
| 11,459,662 B2 | 10/2022 | Murahara |
| 11,501,883 B2 | 11/2022 | Eichel et al. |
| 2004/0093957 A1 | 5/2004 | Griffin et al. |
| 2006/0000071 A1 | 1/2006 | Lin |
| 2009/0046825 A1 | 2/2009 | Dulka et al. |
| 2012/0302811 A1 | 11/2012 | Long |
| 2015/0040727 A1 | 2/2015 | Kosslow |
| 2015/0107371 A1 | 4/2015 | Khrakovsky |
| 2015/0310948 A1 | 10/2015 | Venneri |
| 2016/0189812 A1 | 6/2016 | Czerwinski |
| 2016/0189813 A1 | 6/2016 | Cisneros, Jr. |
| 2016/0217874 A1 | 7/2016 | Dewan et al. |
| 2017/0271033 A1 | 9/2017 | Dodson et al. |
| 2017/0292179 A1 | 10/2017 | Hackett |
| 2017/0294241 A1 | 10/2017 | Dodson et al. |
| 2017/0294242 A1 | 10/2017 | Simpson et al. |
| 2017/0301413 A1 | 10/2017 | Cisneros, Jr. |
| 2017/0301418 A1 | 10/2017 | Dodson et al. |
| 2018/0254109 A1 | 9/2018 | Cheatham, III et al. |
| 2019/0015806 A1 | 1/2019 | Gellaboina |
| 2019/0057783 A1 | 2/2019 | LeBlanc |
| 2019/0139665 A1 | 5/2019 | Czerwinski et al. |
| 2019/0371482 A1 | 12/2019 | Benson |
| 2020/0087156 A1 | 3/2020 | Kelleher |
| 2020/0122109 A1 | 4/2020 | Kruizenga et al. |
| 2020/0161015 A1 | 5/2020 | Czerwinski et al. |
| 2020/0180975 A1 | 6/2020 | Benson |
| 2021/0130181 A1 | 5/2021 | Brown et al. |
| 2021/0210235 A1 | 7/2021 | Venneri |
| 2022/0005617 A1 | 1/2022 | Snead |
| 2022/0051818 A1 | 2/2022 | Cisneros, Jr. |
| 2022/0139577 A1 | 5/2022 | Cisneros, Jr. et al. |
| 2022/0139578 A1 | 5/2022 | Venneri et al. |
| 2022/0250936 A1 | 8/2022 | Benson |
| 2022/0390334 A1 | 12/2022 | Jorgensen |
| 2023/0104365 A1 | 4/2023 | Eichel et al. |
| 2024/0167919 A1 | 5/2024 | Biegalski |
| 2024/0192123 A1 | 6/2024 | Robison |

FOREIGN PATENT DOCUMENTS

| | | |
|---|---|---|
| CN | 203080087 | 7/2013 |
| CN | 102967494 | 4/2015 |
| CN | 103714371 | 5/2016 |
| CN | 104090004 | 5/2016 |
| CN | 106128533 | 11/2016 |
| CN | 106283112 | 1/2017 |
| CN | 106425315 | 2/2017 |
| CN | 107230506 | 10/2017 |
| CN | 106158053 | 11/2017 |
| CN | 107344726 | 11/2017 |
| CN | 106180254 | 6/2018 |
| CN | 108172318 | 6/2018 |
| CN | 108389634 | 8/2018 |
| CN | 109141969 | 1/2019 |
| CN | 109207128 | 1/2019 |
| CN | 105838339 | 3/2019 |
| CN | 109509562 | 3/2019 |
| CN | 106621429 | 4/2019 |
| CN | 106840765 | 4/2019 |
| CN | 109671510 | 4/2019 |
| CN | 106902526 | 6/2019 |
| CN | 106477618 | 7/2019 |
| CN | 110042434 | 7/2019 |
| CN | 105420737 | 9/2019 |
| CN | 105463306 | 9/2019 |
| CN | 106221678 | 9/2019 |
| CN | 108179432 | 9/2019 |
| CN | 110194494 | 9/2019 |
| CN | 107469628 | 10/2019 |
| CN | 108109710 | 10/2019 |
| CN | 209496626 | 10/2019 |
| CN | 108231224 | 12/2019 |
| CN | 108511089 | 12/2019 |
| CN | 106517097 | 2/2020 |
| CN | 110783010 | 2/2020 |
| CN | 210803355 | 6/2020 |
| CN | 108956744 | 7/2020 |
| CN | 109637682 | 9/2020 |
| CN | 106957636 | 10/2020 |
| CN | 110203886 | 10/2020 |
| CN | 109011696 | 12/2020 |
| CN | 112062567 | 12/2020 |
| CN | 112111251 | 12/2020 |
| CN | 112284170 | 1/2021 |
| CN | 112322939 | 2/2021 |
| CN | 112357885 | 2/2021 |
| CN | 108956443 | 3/2021 |
| CN | 109097001 | 3/2021 |
| CN | 110689984 | 3/2021 |
| CN | 109231241 | 4/2021 |
| CN | 110444311 | 5/2021 |
| CN | 112778012 | 5/2021 |
| CN | 108088813 | 6/2021 |
| CN | 112946046 | 6/2021 |
| CN | 113174240 | 7/2021 |
| CN | 213707743 U | 7/2021 |
| CN | 109680282 | 9/2021 |
| CN | 113372886 | 9/2021 |

(56) References Cited

FOREIGN PATENT DOCUMENTS

| | | |
|---|---|---|
| CN | 112391653 | 11/2021 |
| CN | 113630582 | 11/2021 |
| CN | 111334258 | 12/2021 |
| CN | 113860350 | 12/2021 |
| CN | 111627571 | 2/2022 |
| CN | 112125281 | 2/2022 |
| CN | 114086111 | 2/2022 |
| CN | 215770541 U | 2/2022 |
| CN | 112695229 | 3/2022 |
| CN | 112429772 | 5/2022 |
| CN | 112479256 | 5/2022 |
| CN | 111141670 | 6/2022 |
| CN | 111627569 | 7/2022 |
| CN | 114813222 | 7/2022 |
| CN | 112530614 | 8/2022 |
| CN | 112700895 | 8/2022 |
| CN | 114842989 | 8/2022 |
| CN | 112151197 | 9/2022 |
| CN | 112891973 | 9/2022 |
| CN | 113044378 | 9/2022 |
| CN | 114288837 | 9/2022 |
| CN | 217405118 U | 9/2022 |
| CN | 112551567 | 11/2022 |
| CN | 112992389 | 11/2022 |
| CN | 113603059 | 11/2022 |
| CN | 112587989 | 12/2022 |
| CN | 112863725 | 12/2022 |
| CN | 112863726 | 12/2022 |
| CN | 113241200 | 12/2022 |
| JP | 2002147695 | 5/2002 |
| KR | 10-2021-0008784 | 1/2002 |
| WO | WO2015017928 | 2/2015 |
| WO | WO2015094450 | 10/2015 |
| WO | WO2017019620 | 2/2017 |
| WO | WO2017032379 | 3/2017 |
| WO | WO2017106509 | 6/2017 |
| WO | WO2017171937 | 10/2017 |
| WO | WO2017172177 | 10/2017 |
| WO | WO2017172948 | 10/2017 |
| WO | WO2017192611 | 11/2017 |
| WO | WO2017199059 | 2/2018 |
| WO | WO2018026536 | 2/2018 |
| WO | WO2018027170 | 2/2018 |
| WO | WO2018031148 | 2/2018 |
| WO | WO2018031681 | 2/2018 |
| WO | WO2018052529 | 3/2018 |
| WO | WO2018064572 | 4/2018 |
| WO | WO2018169588 | 10/2018 |
| WO | WO2018213669 | 1/2019 |
| WO | WO2019231971 | 1/2020 |
| WO | WO2020123513 | 8/2020 |
| WO | WO2022006169 | 1/2022 |
| WO | WO2022076084 | 6/2022 |
| WO | WO2022146446 | 7/2022 |

OTHER PUBLICATIONS

Hoffman, "Fudamentals of Ultrasonic-Flow Measurements for Industrial Applications," Krohne Messtechnik Gmbh & Co. KG Duisburg, 2000, 31 pages.

A sampling device for molten-salt systems' (McDonald et al.), Mar. 7, 1960 (Mar. 7, 1960). online, retrieved from <URL:https://www.ostl.gov/servlets/purl/4187309>.

Operation of the Sampler Enricher In the Molten Salt Reactor Experiment' {Gallaher}, Oct. 2, 1971 (Oct. 2, 1971), (online, retrieved from.

Blain R. Lancaster, High Resolution Distributed Temperature Measurements Using Optical Fibers In A Molten Salt Forced Convection Environment, Texas A&M University, pp. 1-53 (Year: 2021).

Harkema et al. Development and Demonstration of a Prototype Molten Salt Sampling Sys-tem. Idaho National Laboratory [online]. Jan. 2023.

McFarlane et al. Fission Product Volatility and Off-Gas Systems for Molten Salt Reactors. US De-partment of Energy, Sep. 3, 2019.

\* cited by examiner

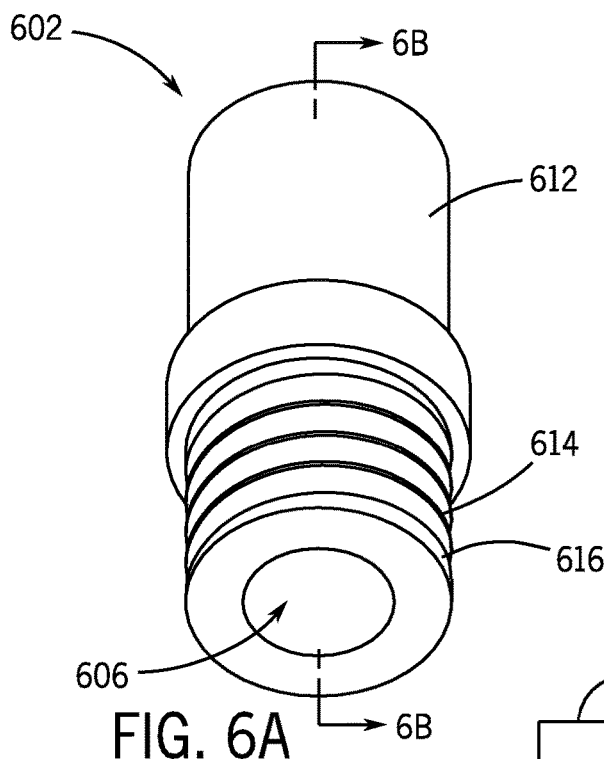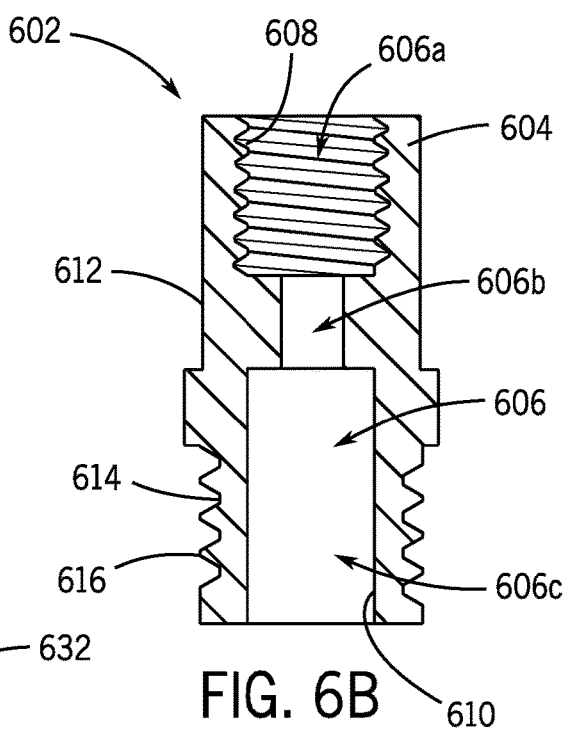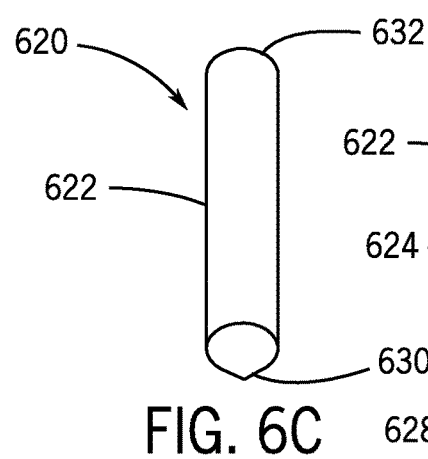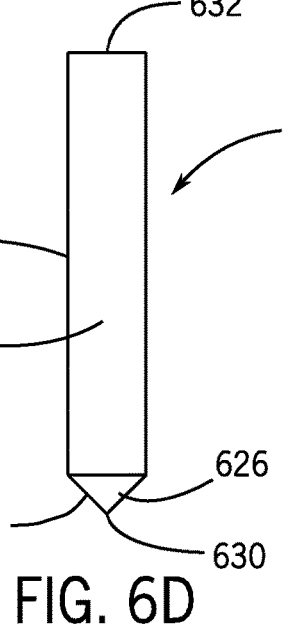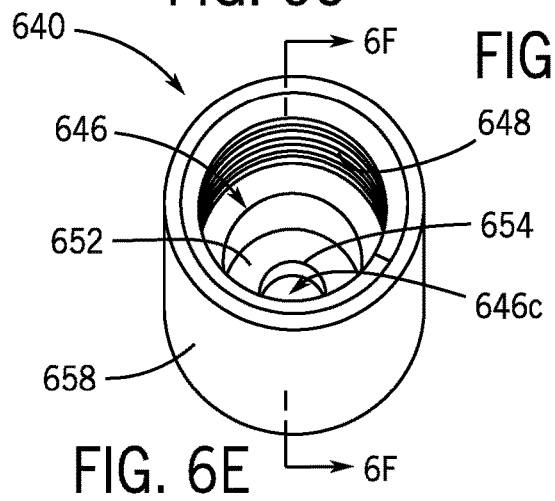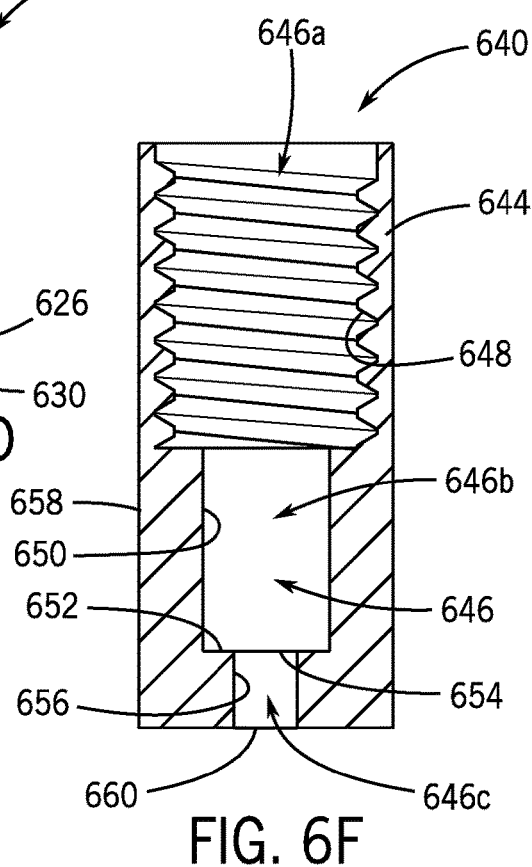

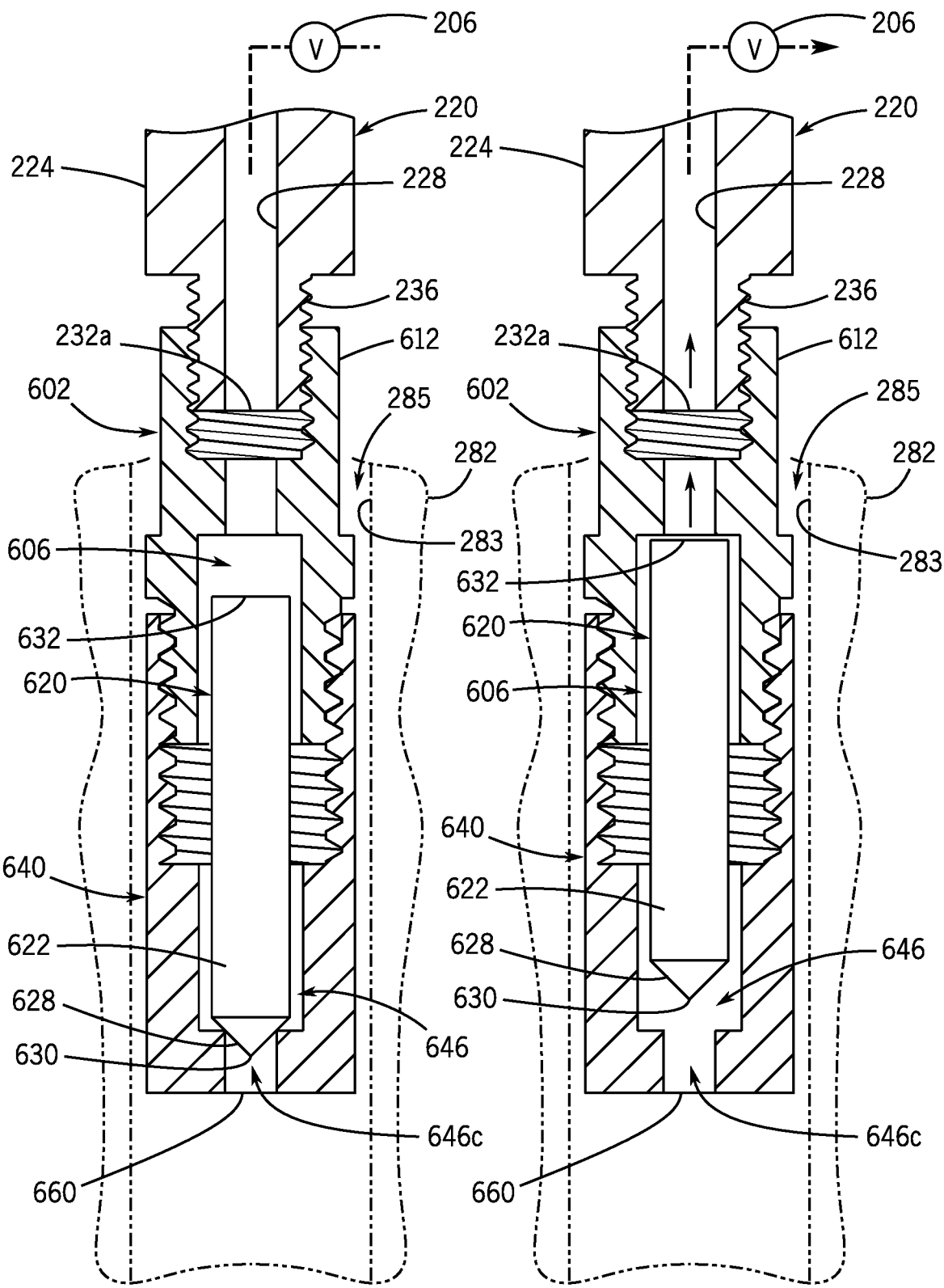

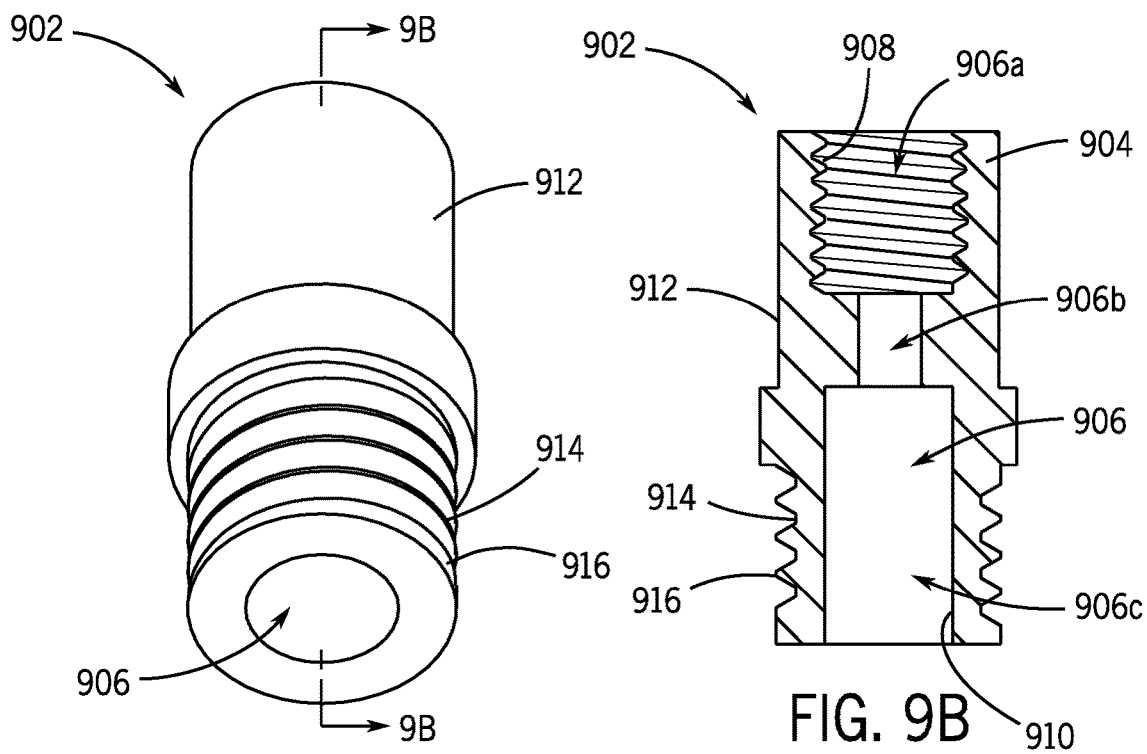
FIG. 9A
FIG. 9B
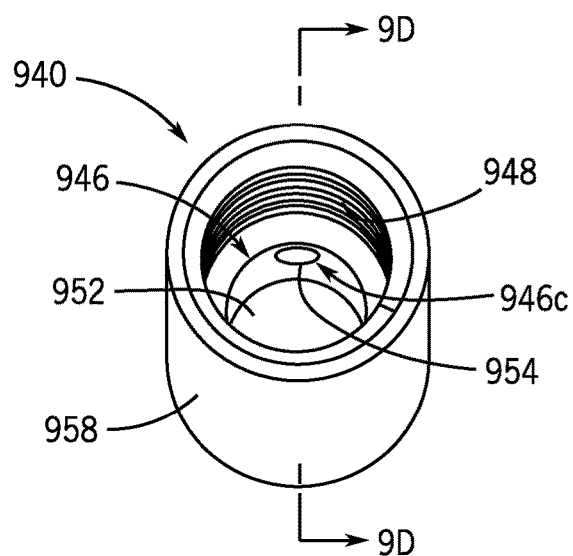
FIG. 9C
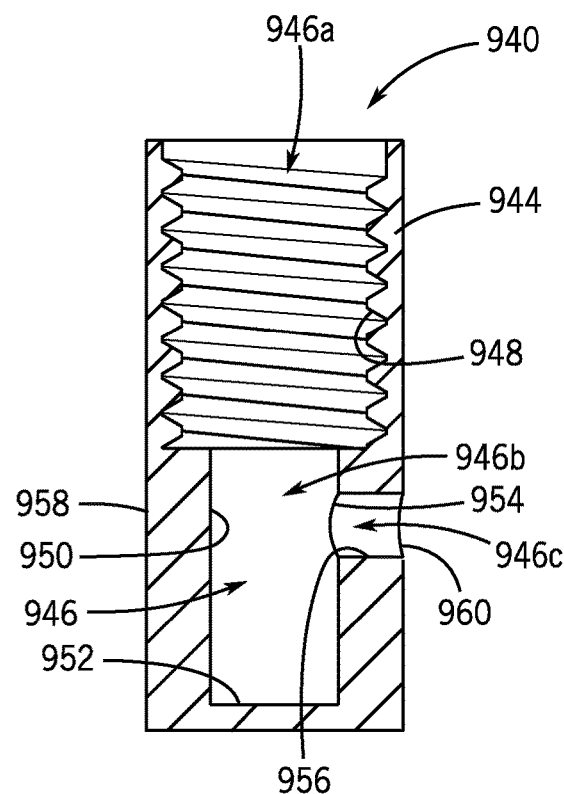
FIG. 9D

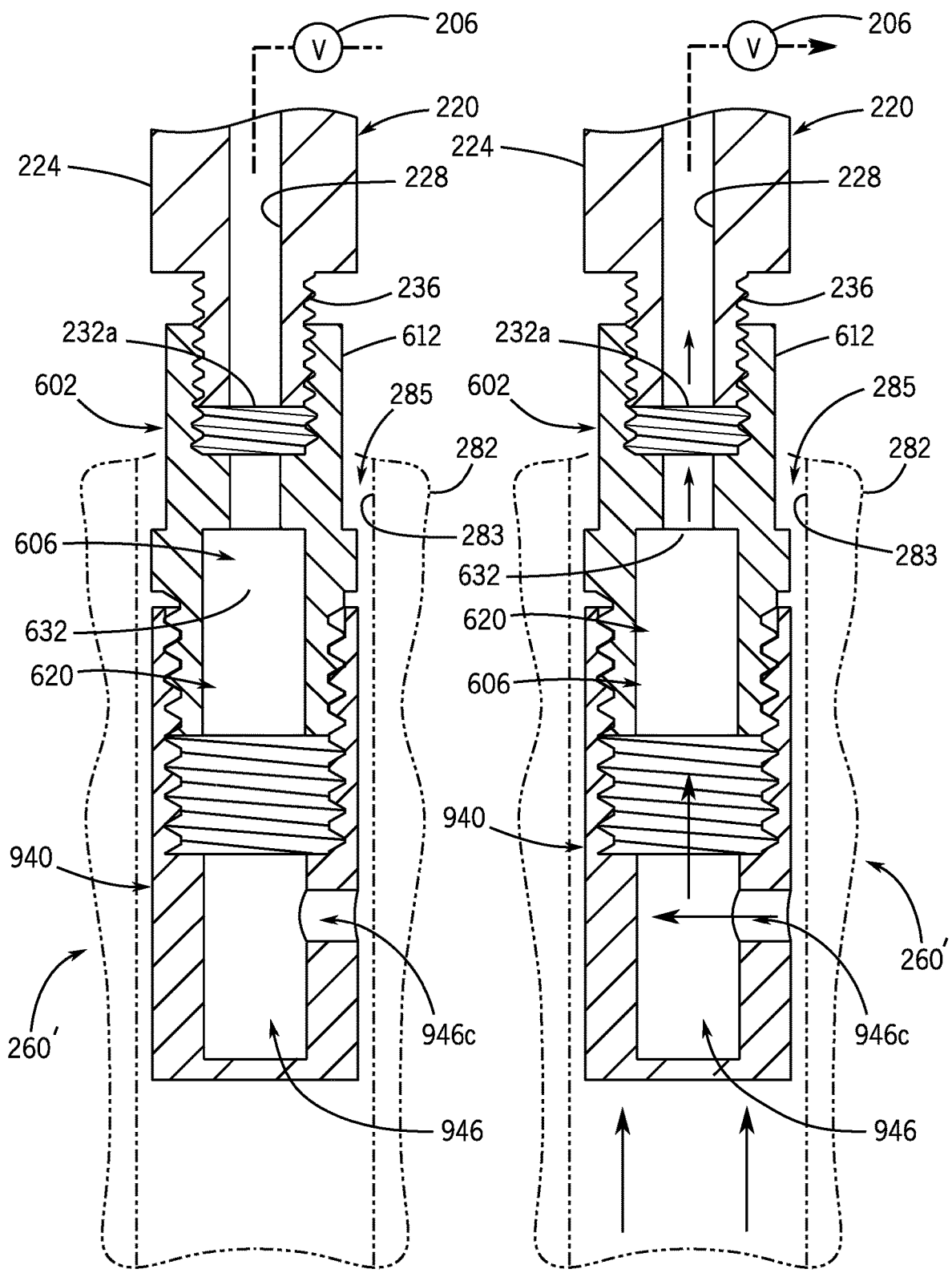

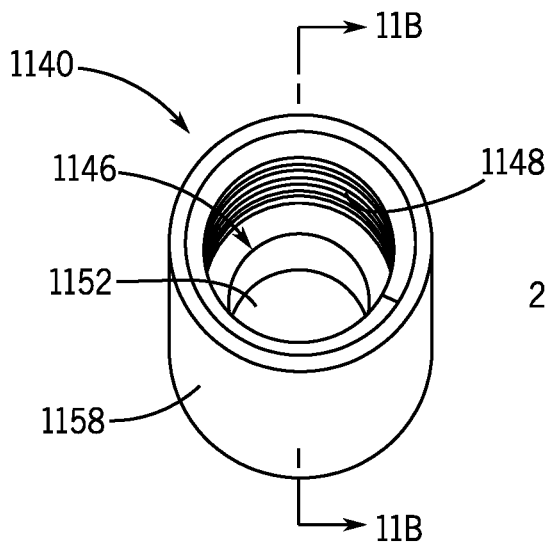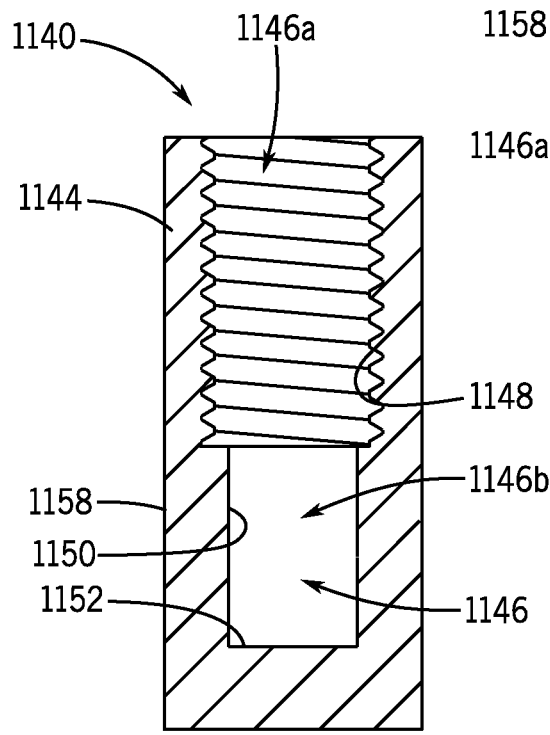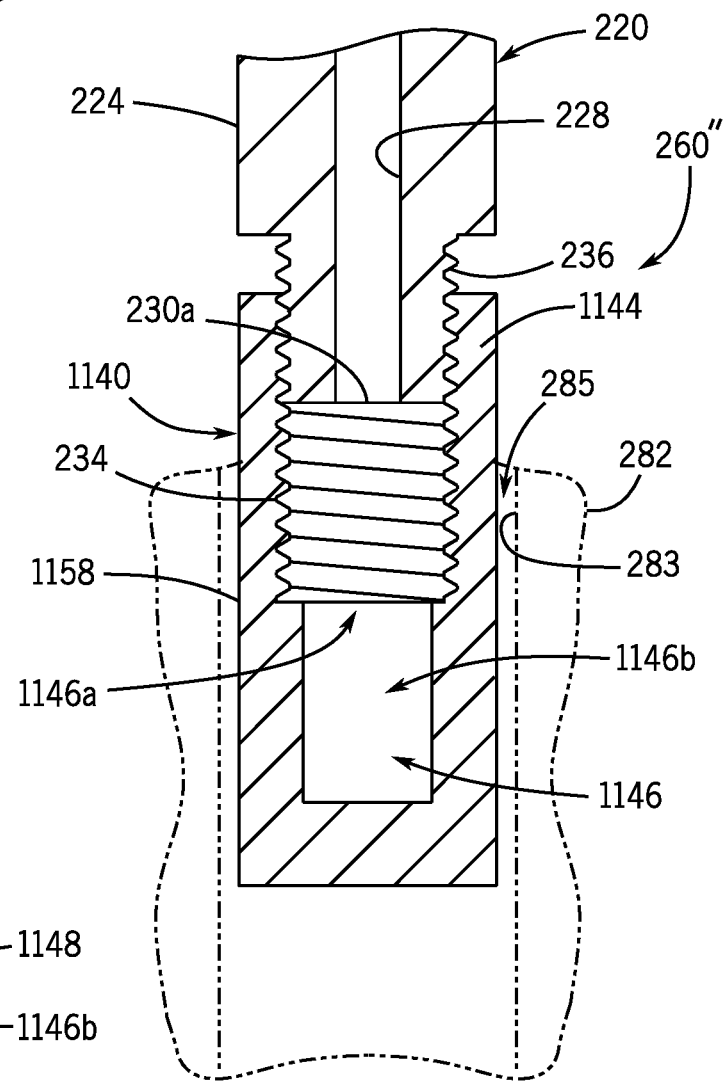
FIG. 11A
FIG. 11B
FIG. 12

MOLTEN SALT SAMPLING SYSTEM AND METHODS OF USE THEREOF

TECHNICAL FIELD

The described examples relate generally to process fluid sampling systems, such as those used in high temperature, corrosive, and/or nuclear environments.

BACKGROUND

Systems that include high temperature, corrosive, or nuclear process fluid may have reason to monitor the process fluid. For example, operators of molten salt reactors may need to monitor the composition, among other information, of the fuel salt within the molten salt reactor. However, retrieving the fuel salt from the molten salt reactor system includes many safety issues due to the nuclear radiation of the fuel salt. Additionally, contaminants in the air and other surfaces may cause undesirable reactions within the molten fuel salt when collecting the sample. Thus, there is a long felt but unresolved need for systems and methods of collecting a molten salt sample from a system while minimizing fuel salt contact with air and other contaminants.

SUMMARY

In one example, a salt sampling system including a salt sampling assembly including an elongated shaft and a collection assembly arranged at a first end of the elongated shaft; an interface assembly engaged with the salt sampling assembly and fluidly coupled with a process fluid of a molten salt system and including a guide component defining a passage configured to receive the shaft and the collection assembly therethrough, and an isolation component configured to reversibly isolate the passage from the molten salt system; and a gas management system fluidly coupled with the salt sampling assembly and the interface assembly and configured to: (i) deliver a supply of the inert gas to the collection assembly, and (ii) a draw a vacuum about an environment of the collection assembly.

In a second aspect, the system of the first aspect or any other aspect, wherein in a first configuration, the collection assembly is arranged in the passage with the isolation component fluidically isolating the collection assembly from the process fluid, and in a second configuration, the shaft is arranged extending through the isolation component such that the collection assembly is positioned for receiving a sample from the process fluid.

In a third aspect, the system of the second aspect or any other aspect, wherein the elongated shaft defines a hollow central portion extending from a first opening at the first end of the elongated shaft to a second opening at a second end of the elongated shaft, and the gas management system is configured to deliver both the supply of the inert gas to the collection assembly and to draw the vacuum from the collection assembly via the second opening and hollow central portion.

In a fourth aspect, the system of the third aspect or any other aspect, wherein in the first configuration, the gas management system is configured to purge an environment of the passage using the supply of inert gas delivered to the collection assembly, and in the second configuration, the gas management system is configured to induce the sample into the collection assembly using the vacuum drawn from the collection assembly.

In a fifth aspect, the system of the fourth aspect or any other aspect, wherein the collection assembly includes a bottom cell that defines an internal sample holding region and an orifice extending between the interior sample holding region and the environment of the collection assembly, the orifice configured to receive the sample from the process fluid and route the sample in the sample holding region, and the gas management system is configured to draw the vacuum from the sample holding region to induce the sample into the collection assembly using the vacuum drawn from the collection assembly.

In a sixth aspect, the system of the fifth aspect or any other aspect, wherein the collection assembly further includes a pin disposed in the sample holding region, and the pin is configured to alternate between a seated configuration in which the pin plugs the orifice when the gas management system ceases the vacuum drawn on the sample holding region ceases, and a raised configuration in which the pin permits passage of the sample through the orifice when the gas management system draws the vacuum on the sample holding region.

In a seventh aspect, the system of the second aspect or any other aspect, wherein the sampling assembly further includes a seal assembly engaged with the guide component and configured to define a seal between the guide component and the elongated shaft, and the seal is maintained while the elongated shaft is in the first configuration, the second configuration, and as the elongated shaft transitions therebetween.

In an eighth aspect, the system of the seventh aspect or any other aspect, wherein the seal assembly includes a flange component having a flange through portion, the flange component mounted to the guide component with the flange through portion aligned with the passage such that the elongated shaft extends therethrough, a multi-material sealing component defining a ring about the flange through portion and having the elongated shaft extending therethrough, and a knob component having a knob through portion, the knob component coupled to the flange component with the knob component through portion aligned with the flange through portion and the ring, the knob component being operatable to tighten the multi-material sealing component against the flange component to define and maintain the seal.

In a ninth aspect, the system of the first aspect or any other aspect, wherein the interface assembly includes a gas inlet port fluidly coupled with the passage and configured to route an inert gas to the passage, and a vacuum port fluidly coupled with the passage and configured to route the vacuum to the passage.

In a tenth aspect, the system of the first aspect or any other aspect, further including a containment structure encompassing at least the salt sampling assembly and defining an inert environment therein.

In an eleventh aspect, a salt sampling assembly including an elongated shaft; a collection assembly arranged at a first end of the elongated shaft, the collection assembly including a bottom cell configured to collect and hold a sample of a process fluid of a molten salt system; and a sealing assembly receiving the elongated shaft and configured to define a seal between the elongated shaft and a component of the molten salt system as the elongated shaft and the collection assembly moves axially through the sealing assembly.

In a twelfth aspect, the assembly of the eleventh aspect or any other aspect, wherein the elongated shaft defines a hollow central portion extending from a first opening at the first end of the elongated shaft to a second opening at a second end of the elongated shaft, and the collection assembly has a width configured to permit passage through the sealing assembly and includes a top cell coupled with the first end and defining a conduit therethrough extending from the first opening, and a bottom cell coupled with the second end and defining a sample holding region extending from the conduit and an orifice extending between the interior sample holding region and the environment of the collection assembly.

In a thirteenth aspect, the assembly of the twelfth aspect or any other aspect, wherein the sample holding region is configured to hold between 0.1 and 1 gram of the sample.

In a fourteenth aspect, the assembly of the twelfth aspect or any other aspect, wherein the bottom cell defines the orifice on a bottommost surface of the bottom cell, and the collection assembly further includes a pin seated in the orifice and moveable therefrom in response to a vacuum drawn from the second opening.

In a fifteenth aspect, the assembly of the fourteenth aspect or any other aspect, wherein the sealing assembly includes a flange component having a flange through portion, the flange component mounted to the guide component with the flange through portion aligned with the passage such that the elongated shaft extends therethrough, a multi-material sealing component defining a ring about the flange through portion and having the elongated shaft extending therethrough, and a knob component having a knob through portion, the knob component coupled to the flange component with the knob component through portion aligned with the flange through portion and the ring, the knob component being operatable to tighten the multi-material sealing component against the flange component to define and maintain the seal.

In a sixteenth aspect, a method of salt sampling, the method including arranging a collection assembly within a passage of an interface assembly, the interface assembly fluidly coupled with a process fluid of a molten salt system; purging an environment of the collection assembly in the passage with an inert gas; opening an isolation component of the interface assembly to fluidically expose the collection assembly to the process fluid; passing the collection assembly through the isolation component by pushing the collection assembly toward the process fluid using an elongated shaft that has an shaft end coupled to the collection assembly; and drawing a vacuum about collection assembly by operating a gas management system that is fluidly coupled with the collection assembly via the elongated tube, wherein the drawn vacuum induces a sample from the process fluid into the collection assembly.

In a seventeenth aspect, the method of the sixteenth aspect or any other aspect, further including, in response to drawing the vacuum, unseating a pin of the collection assembly from an orifice in the collection assembly and allowing the sample to enter the collection assembly, via the orifice.

In an eighteenth aspect, the method of the seventeenth aspect or any other aspect, further including ceasing the vacuum and causing the pin to seat in the orifice of the collection assembly, thereby plugging the orifice.

In a nineteenth aspect, the method of the eighteenth aspect or any other aspect, further including raising the collection assembly from the interface assembly, and closing the isolation component to fluidically isolate the collection assembly from the process fluid.

In a twentieth aspect, the method of the nineteenth aspect or any other aspect, further including removing the collection assembly including the sample from the interface assembly, and maintaining the collection assembly and sample in an inert environment.

In addition to the example aspects described above, further aspects and examples will become apparent by reference to the drawings and by study of the following description.

BRIEF DESCRIPTION OF THE DRAWINGS

FIG. 6A depicts a perspective view of an example top cell of the salt sampling assembly of FIG. 3.

FIG. 6B depicts a cross-sectional view of the example top cell of FIG. 6A, taken along line 6B-6B of FIG. 6A.

FIG. 6C depicts a perspective view of a floating pin of the salt sampling assembly of FIG. 3.

FIG. 6D depicts a cross-sectional view of the floating pin of FIG. 6C, taken along line 6D-6D of FIG. 6C.

FIG. 6E depicts a perspective view of an example bottom cell of the salt sampling assembly of FIG. 3.

FIG. 6F depicts a cross-sectional view of the example bottom cell of FIG. 6E, taken along line 6F-6F of FIG. 6E.

FIG. 8A depicts a cross-sectional view of the example molten salt system of FIG. 2B, taken along line 8A-8A of FIG. 2B, including an example collection assembly in a first configuration having the example top cell of FIG. 6A and the example bottom cell of FIG. 6E.

FIG. 8B depicts a cross-sectional view of the example molten salt system of FIG. 2B, taken along line 8A-8A of FIG. 2B, the example collection assembly of FIG. 8A in a second configuration.

FIG. 9A depicts a perspective view of another example top cell of the salt sampling assembly of FIG. 3.

FIG. 9B depicts a cross-sectional view of the example top cell of FIG. 9A, taken along line 9B-9B of FIG. 9A.

FIG. 9C depicts a perspective view of another example bottom cell of the salt sampling assembly of FIG. 3.

FIG. 9D depicts a cross-sectional view of the example bottom cell of the salt sampling assembly of FIG. 9C, taken along line 9D-9D of FIG. 9C.

FIG. 10A depicts a cross-sectional view of the example molten salt system of FIG. 2B, taken along line 8A-8A of FIG. 2B, including another example collection assembly in a first configuration having the example top cell of FIG. 9A and the example bottom cell of FIG. 9C.

FIG. 10B depicts a cross-sectional view of the example molten salt system of FIG. 2B, taken along line 8A-8A of FIG. 2B, including the example collection assembly of FIG. 10A in a second configuration.

FIG. 11A depicts a perspective view of another example bottom cell of the salt sampling assembly of FIG. 3.

FIG. 11B depicts a cross-sectional view of the example bottom cell of the salt sampling assembly of FIG. 11A, taken along line 11B-11B of FIG. 11B.

FIG. 12 depicts a cross-sectional view of the example molten salt system of FIG. 2B, taken along line 8A-8A of FIG. 2B, including another example collection assembly having the example bottom cell of FIG. 11A.

Figure 1:
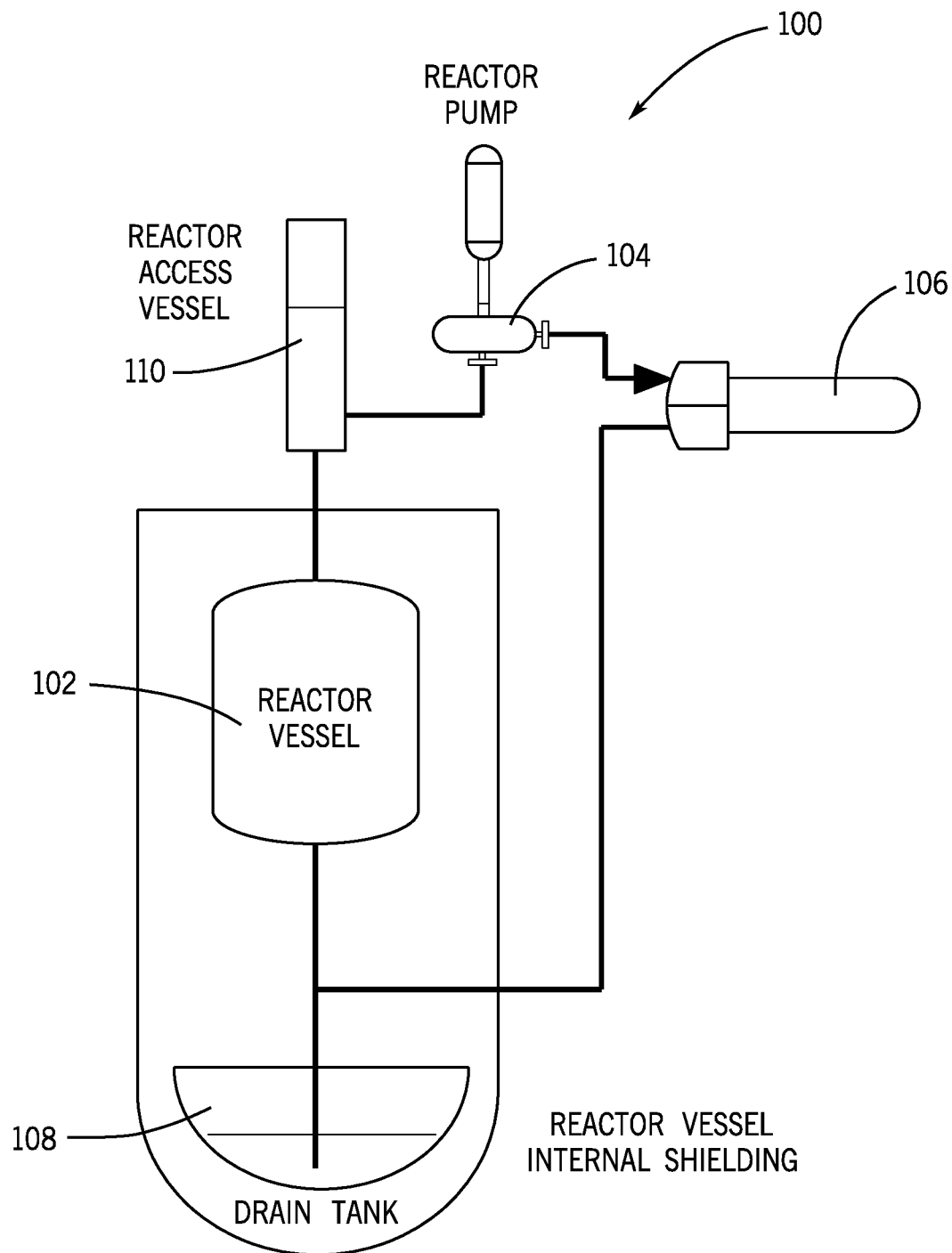
FIG. 1 depicts a schematic representation of an example molten salt reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to process fluid sampling systems, such as those used in high temperature, corrosive, and/or nuclear environments.

Systems that include high temperature, corrosive, or nuclear process fluid, such as molten salt reactor systems, may, for a variety of reasons, have reason to monitor the process fluid within the system. Though some tests can be performed using sensors while the process fluid is within the system, collecting a physical sample of the process fluid from the system and testing the sample may yield more information. For example, operators of molten salt reactors may need to monitor the composition, among other information, of a molten fuel salt within the molten salt reactor. However, retrieving the fuel salt from the molten salt reactor system includes many safety issues due to the nuclear radiation of the fuel salt and the temperature of the system (upwards of 700° C.). Additionally, reactants and/or contaminants in the air and other surfaces can cause undesirable chemical reactions within the molten fuel salt, which can significantly alter the composition of the fuel salt and make the fuel salt more corrosive to the system, which may potentially cause costly shutdowns, safety concerns, and the purchase and use of additional fuel salt in the system.

Thus, a molten salt sampling system, assemblies, and method are disclosed herein. The molten salt sampling system is capable, generally, of extracting about 0.1 to 1 gram of salt sample to be used for testing purposes, though the sampling system may extract more or less than 0.1-1 gram of salt sample. In the disclosed sampling system, a collection assembly is inserted into the system, through a valve-like component, and into a component or area containing the fuel salt, where the collection assembly collects the fuel salt, aided, in some embodiments, by a vacuum system that pulls the sample into the collection assembly, and, the collection assembly is thereafter pulled out of the system completely, whereby the salt is removed from the collection assembly outside of the sampling system and utilized for testing purposes. Additionally, to solve issues regarding air and other reactants and contaminants that can contaminate the salt, a containment space is provided around the sampling system and purged of most to all air with an inert gas. A cover gas system is also connected to the sampling system, which purges the components of the sampling system of any air or other gases with an inert gas. The containment structure may also include a built-in glove box that allows an operator of the sampling system to maneuver and affect the various components while using the sampling system.

In various embodiments, the salt sampling system includes a salt sampling assembly, an interface assembly that is engaged with the salt sampling assembly and fluidically connected with a process fluid of the molten salt reactor system, and a gas management system fluidically connected with the salt sampling assembly and the interface assembly. The salt sampling assembly may include an elongated shaft having a collecting assembly removably coupled to a first end of the elongated shaft. The interface system may include a guide component that defines a passage configured to receive the elongated shaft and the collection assembly therethrough, and an isolation component configured to reversibly isolate the passage from the molten salt system. The gas management system may be configured to deliver a supply of the inert gas to the collection assembly, and to draw a vacuum about an environment of the collection assembly.

Generally, the gas management system may be used to purge the components of the sampling system, and once purged, the collection assembly and elongated shaft are placed in the guide assembly, and the isolation component is opened to an open position so that the collection assembly and at least part of the elongated shaft can pass through the isolation component. The gas management system may be utilized to draw a vacuum on the collection assembly, and the collection assembly is passed through the isolation component and into the area containing the fuel salt. The vacuum may draw the salt sample into the collection assembly, and the collection assembly is moved out of the interface assembly and out of the system. The isolation component is moved to a closed position once the collection assembly and elongated shaft are out of the isolation component.

Turning to the drawings, for purposes of illustration, FIG. 1 depicts a schematic representation of an example molten salt reactor system 100. The molten salt reactor system 100 may implement and include the salt sampling systems, as described in greater detail below. As will be understood and appreciated, the example shown in FIG. 1 represents merely one example environment in which the salt sampling system may be utilized. It will be understood that the salt sampling system, assemblies and methods described herein may be used in and with substantially any other environment or operating system.

In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be $LiF—BeF_2—UF_4$, though other compositions of fuel salts may be utilized as fuel salts within the reactor system 100. The fuel salt within the reactor system 100 is heated to high temperatures (about 700° C.) and melts as the reactor system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping in between each component. The molten salt reactor system 100 may also include additional components, such as, but not limited to, drain tank 108 and reactor access vessel 110). The drain tank 108 may be configured to store the fuel salt once the fuel salt is in the reactor system 100 but in a subcritical state, and also acts as storage for the fuel salt if power is lost in the reactor system 100. The reactor access vessel may be configured to allow for introduction of small pellets of uranium fluoride ($UF_4$) to the reactor system 100 as necessary to bring the reactor to a critical state and compensate for depletion of fissile material.

A molten salt sampling system, such as molten salt sampling system 200, may be used in conjunction with reactor system 100, so that fuel salt samples may be safely collected from the reactor system 100. For example, molten salt sampling system 200 may be connected to any of the components as described in FIG. 1. It may be desirable to collect salt samples to test for information regarding the redox potential of the salts, fission product content, fuel content, tritium production, and other information. In general, the salt sampling system 200 keeps the fuel salt isolated from the environment outside the reactor system 100, until the system 200 is utilized to collect a salt sample. The system 200 may open one or more isolation components (e.g., valves) so that a collection assembly can be positioned within the reactor system 100 to collect a salt sample weighing about 0.1-1 gram (though, in certain embodiments, the sample may weigh more or less, depending on the needs of the tests to be run on the sample), and upon removing the collection assembly from the reactor system 100, closing the one or more isolation components so that the reactor system 100 is once again isolated. The collection assembly is completely removed from the reactor system 100 and the sampling system 200 so that the 0.1-1 gram salt sample may be analyzed. Molten fuel salt samples collected by the sampling system 200 are about 0.1-1 gram of molten salt so that there is enough salt in the sample to have a representative sample of the fuel salt in the system, while not collecting too much that presents increased safety risks or takes too much out of the reactor system 100. The system 200 may additionally utilize a purge gas system and a vacuum system to remove unwanted contaminants from the components in fluid connection within system 200 prior to un-isolating the reactor system 100.

Figure 2A:
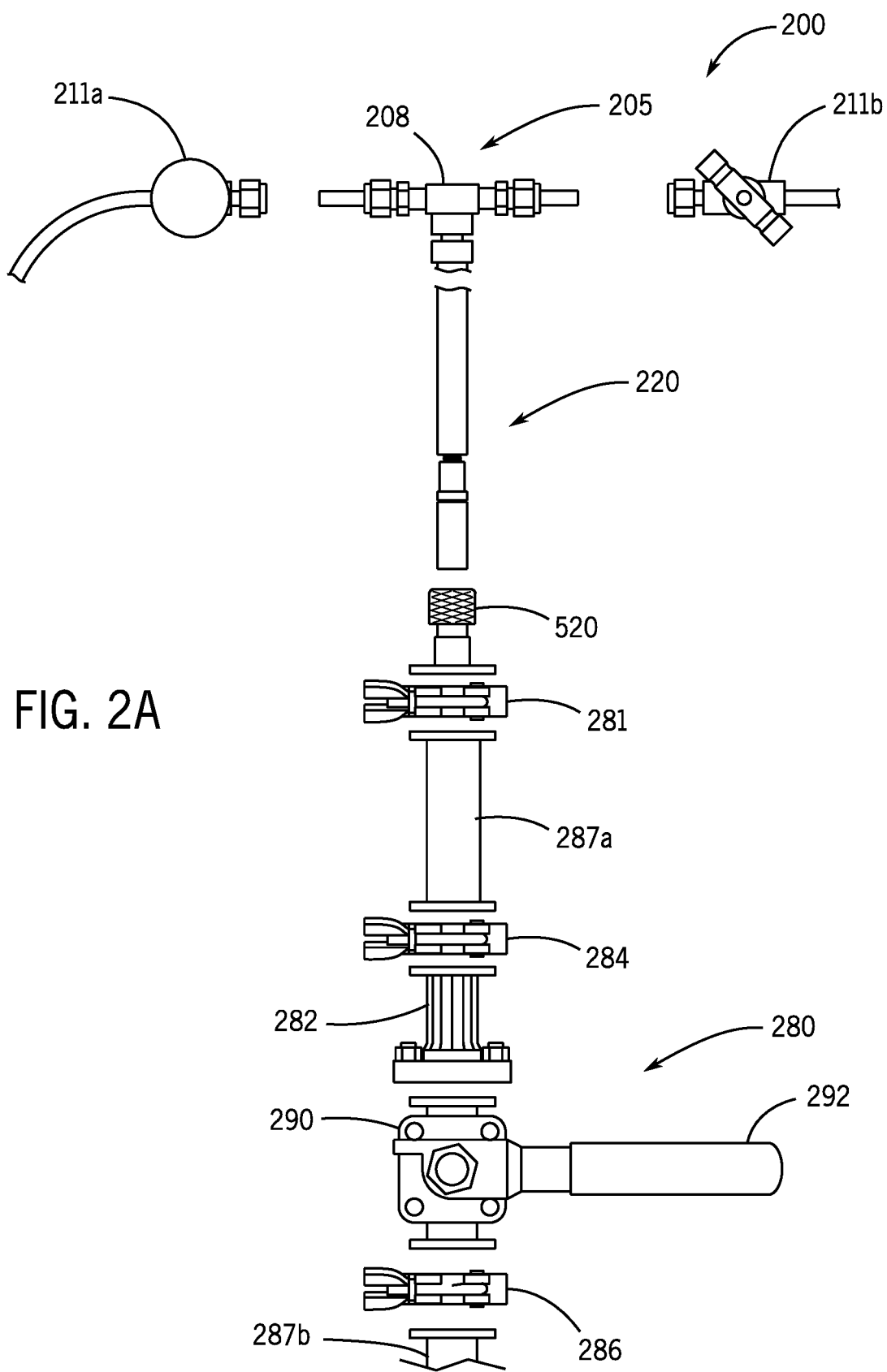
FIG. 2A depicts an exploded view of the example molten salt sampling system.
Figure 2B:
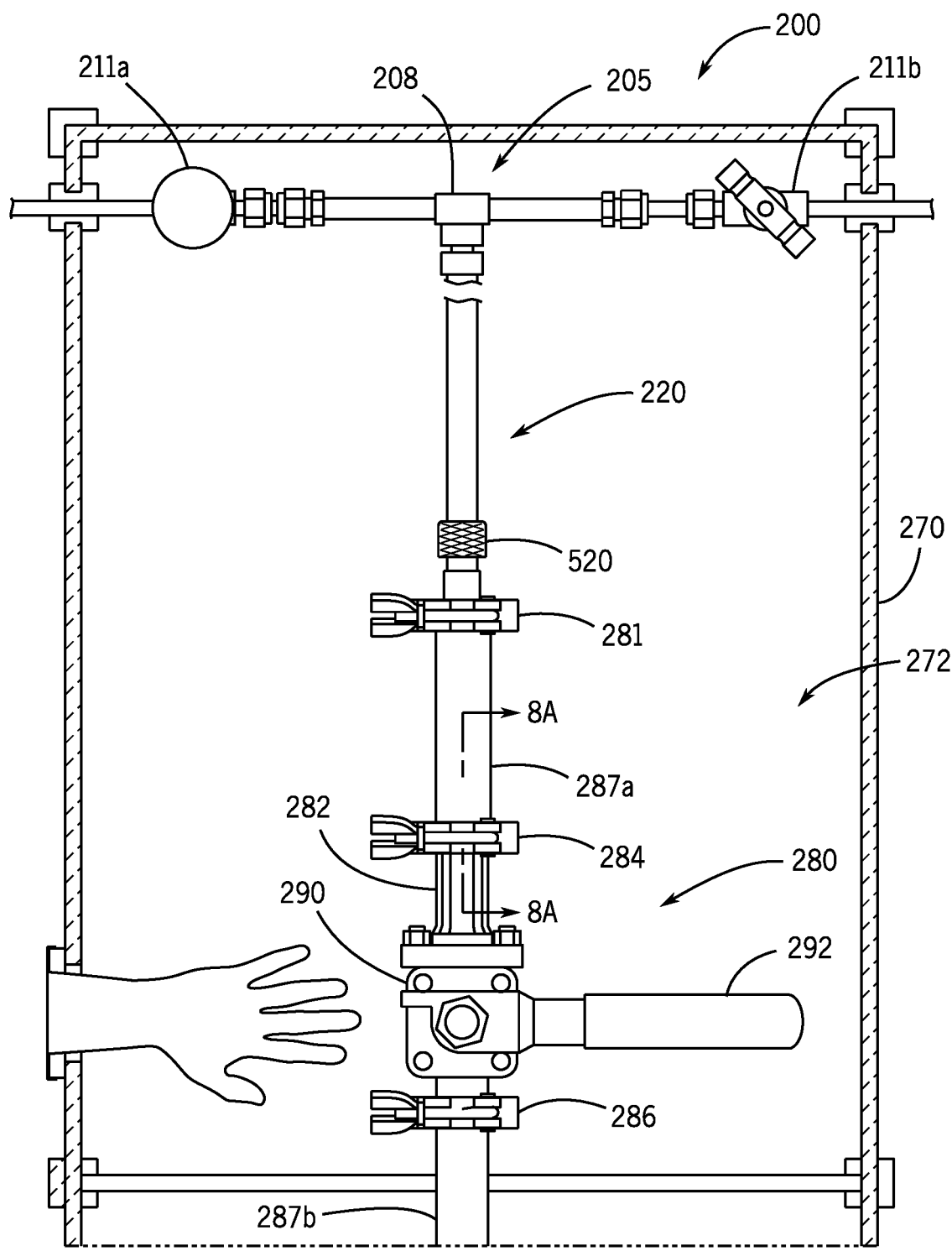
FIG. 2B depicts the example molten salt sampling system of FIG. 2A, including a containment structure.
Figure 15:
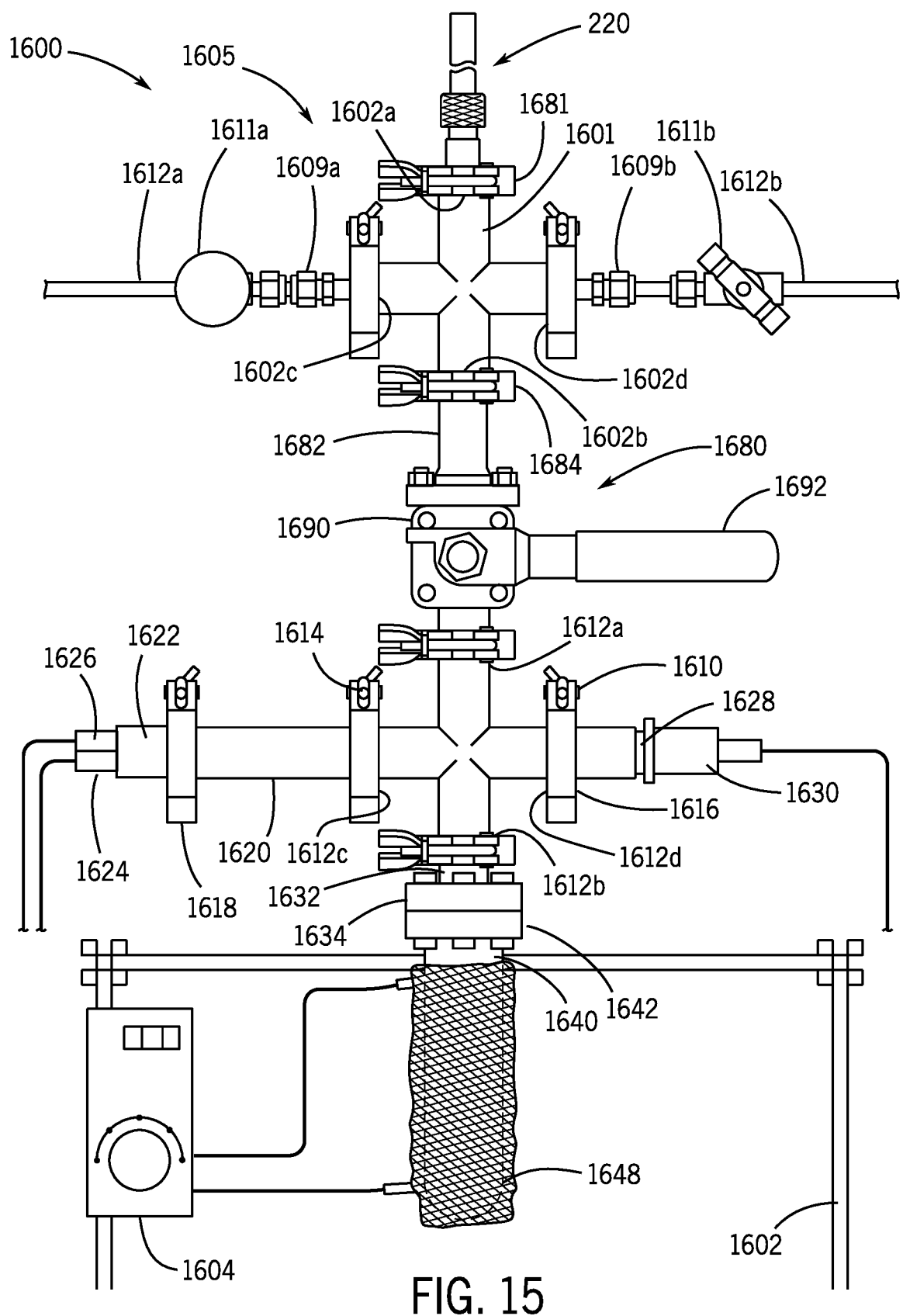
FIG. 15 depicts another example molten salt sampling system, including a crucible.

Turning now to FIG. 2A, a front view of an example molten salt sampling system 200 is shown, according to one embodiment of the present disclosure. In various embodiments, the molten salt sampling system 200 (also referred to herein as "system 200") may include a gas management system 205, a salt sampling assembly 220, and an interface assembly 280. In some embodiments, the system 200 may be utilized in conjunction with a commercial system, such as reactor system 100, or in a laboratory setting, to pull a sample of nuclear fuel salt (or other process fluid) from a system in order to perform tests on the sample. The system 200 may be configured to pull the sample in a manner that mitigates risks associated with pulling the sample, including utilizing a vacuum system 207 to help retrieve the salt sample from the reactor system 100, by keeping the system 200 within a containment structure 272, and by including an isolation component that keeps the fuel salt isolated from the other components of the sampling system 200 until a collection assembly 260 is about to be inserted into the system 100. In several embodiments, as shown in FIG. 2B, the system 200 may be within a containment structure 270 having a containment space 272. For example, the system 200 may be utilized with a system such as reactor system 100 within the containment space 272 of the containment structure 270. In other embodiments, as shown in FIGS. 15-17, the system 200 may be utilized in a laboratory setting, such as laboratory setting within the experiment structure 1702.

In many embodiments, the gas management system 205 provides a cover gas and a vacuum (separately) to the salt sampling system 200. In some embodiments, the cover gas may be provided by a cover gas system 207 of the gas management system 205 to the interface assembly 280 to purge any reactant or contaminant (such as, but not limited to, air) from the assembly 280. In one or more embodiments, once the system 200 is purged of any reactant, the gas management system 205, via a vacuum system 206, may pull a vacuum on the assembly 280 in order to gather salt for sampling. The cover gas system 207 and the vacuum system 206 are shown schematically, for purposes of illustration, in FIG. 2C. It will be appreciated that the cover gas system 207 and the vacuum system 206 may include any appropriate components and arrangement thereof in order to provide a cover gas and draw a vacuum, respectively. In one example, the cover gas system 207 includes at least a source of inert gas (such as, but not limited to, an argon gas tank), that is fluidically connected to the tubing 212a. Further, the vacuum system 206 includes at least a vacuum pump that can draw a vacuum on an attached system (such as sampling system 200). In one embodiment, the vacuum pump may be a dry scroll pump, and may also be fitted with a particulate filter to filter out any aerosolized fuel salts. In other examples, more or different components of the cover gas system 207 and/or the vacuum system may be used.

Figure 2C:
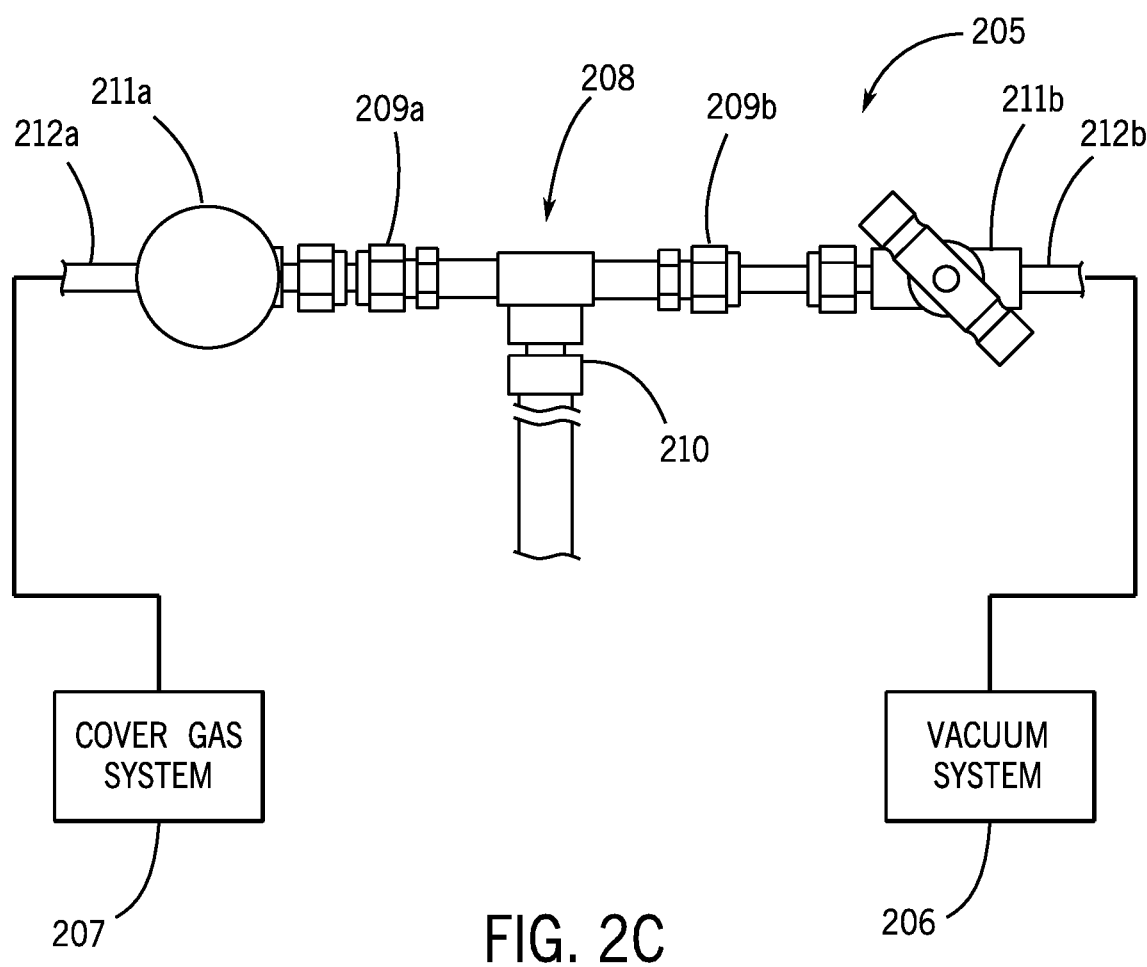
FIG. 2C depicts a gas management system of the example molten salt sampling system of FIG. 2A.

In at least one embodiment, as shown in FIG. 2C, the gas management system 205 may include a fitting 208 that is fluidically connected to the cover gas system 207, the vacuum system 206, and the salt sampling assembly 220 and interface assembly 280. In several embodiments, the cover gas system 207 is fluidically connected to tubing 212a, which is fluidically connected to a gas inlet valve 211a. In certain embodiments, the gas inlet valve is fluidically connected to a gas inlet port 209a, which is fluidically connected to the fitting 208. In many embodiments, the fitting 208 may be a tee pipe, or any other type of pipe or fitting, having multiple openings, wherein the cover gas system 207, the vacuum system 206, and the salt sampling assembly 220 are each connected to a separate opening of the fitting 208.

In multiple embodiments, the vacuum system is fluidically connected to tubing 212b, which is fluidically connected to a vacuum valve 211b. In one or more embodiments, the vacuum valve 211b is fluidically connected to the vacuum port 209b, which is fluidically connected to the fitting 208. In at least one embodiment, the salt sampling assembly 220 is fluidically connected to passage port 210, which is fluidically connected to the fitting 208.

Figures 3, 4:
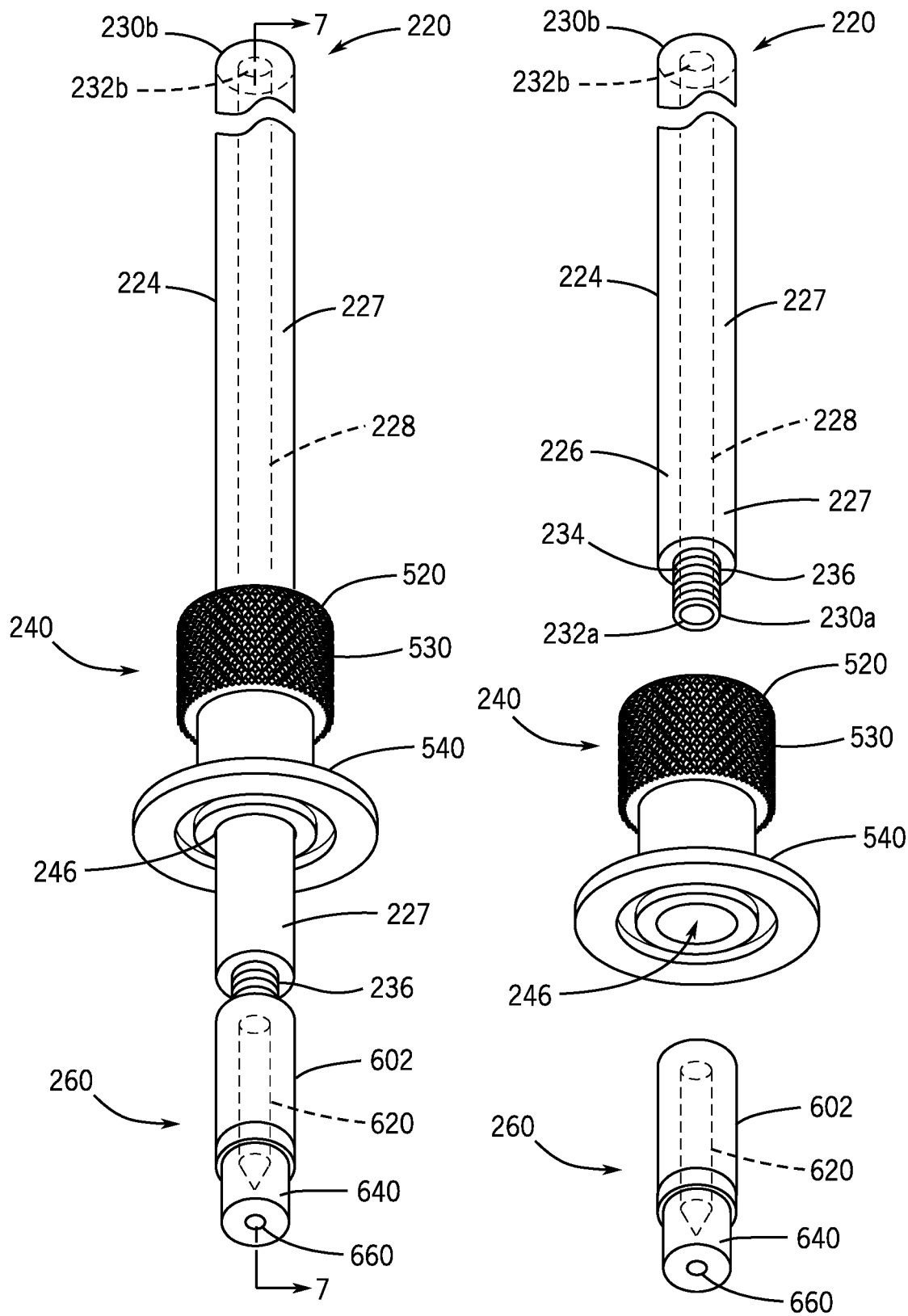
FIG. 3 depicts an example salt sampling assembly of the example molten salt system of FIG. 2A.
FIG. 4 depicts an exploded view of the salt sampling assembly of FIG. 3.

In one or more embodiments, as shown in more detail in FIGS. 3 and 4, the salt sampling assembly 220 includes an elongated shaft 224, a seal assembly 240, and a collection assembly 260. In multiple embodiments, the elongated shaft 224 may extend through the seal assembly 240 and fasten or connect to the collection assembly 260 so that the seal assembly 240 is around the elongated shaft 224. In several embodiments, the elongated shaft 224 defines a tubular body 226 having a first end 230a and a second end 230b, and a shaft surface 227. In many embodiments, the first end 230a defines a first opening 232a, and the second end 230b defines a second opening 232b. In at least one embodiment, the tubular body 226 defines a central hollow portion 228 that extends through the tubular body 226 to the first opening 232a and the second opening 232b. In at least one embodiment, the second end 230b may fluidically connect with the fitting 208, so that gas can go through the central hollow portion 228 of the tubular body 226. In certain embodiments, the first end 230a may have a threaded portion 234 defining a shaft threaded surface 236.

In various embodiments, as shown in FIGS. 3 and 4, the seal assembly 240 includes a knob component 520, a knurled surface 530, and a flange component 540. In one or more embodiments, the flange component 540 may also include a flange component through portion 246 that extends through the flange component 540. In several embodiments, as shown in FIGS. 5A-E, the seal assembly 240 includes a multi-material sealing component 502 that defines a ring or body shape 504 having a structural out piece 508, a sealing inner piece 512, a sealing surface 516, and a ring through portion 518 that extends through the ring shape 504. In at least one embodiment, the multi-material sealing component 502 may be a gasket, O-ring, or other type of sealing component.

Figure 5B:
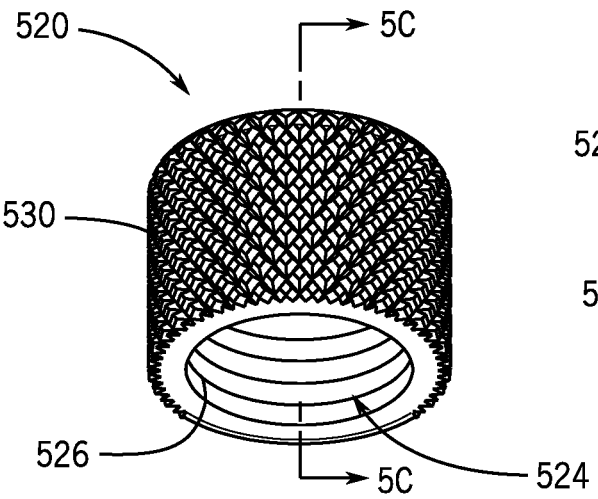
FIG. 5B depicts a perspective view of an example knob component of the salt sampling assembly of FIG. 5A.
Figure 5C:
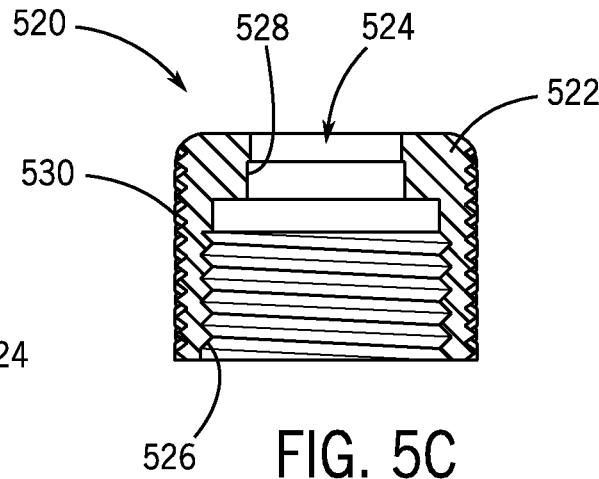
FIG. 5C depicts a cross-sectional view of the example knob component of FIG. 5A, taken along line 5C-5C of FIG. 5B.
Figure 5A:
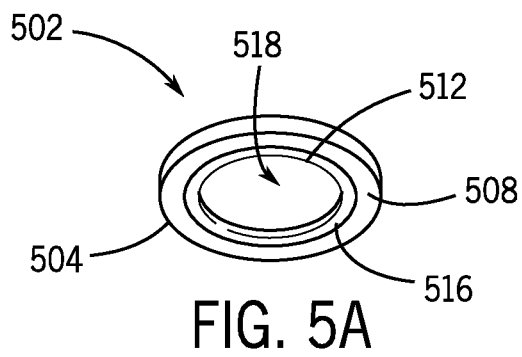
FIG. 5A depicts a perspective view of an example sealing component of the salt sampling assembly of FIG. 4.

In multiple embodiments, the seal assembly includes the knob component 520. In some embodiments, as shown in FIGS. 5B and 5C, the knob component 520 includes the knurled surface 530, and also defines a knob body 522 defining a knob through portion 524 that extends through the knob body 522. In many embodiments, the knob body 522 also includes a threaded interior surface 526 and a stepped interior surface 528. In certain embodiments, the knob body 522 is formed from a single piece of material, though it may also be formed from more than one pieces of material. In one embodiment, the stepped interior surface 528 assists in aligning the elongated shaft 224 as the elongated shaft 224 extends through the knob body 522 via the knob through portion 524. In certain embodiments, the multi-material sealing component 502 has a diameter that is smaller than the diameter of the threaded interior surface 526 of the knob through portion 524, so that the multi-material sealing component 502 may be positioned within the interior of the knob body 522. In one embodiment, the multi-material sealing component 502 may prevent fluid (such as, but not limited to, molten fuel salt) that seeps in between the shaft surface 227 of the elongated shaft 224 and a flange interior surface 548 of the flange component 520 from traveling further up the shaft surface 227 past the seal assembly 240.

Figure 5D:
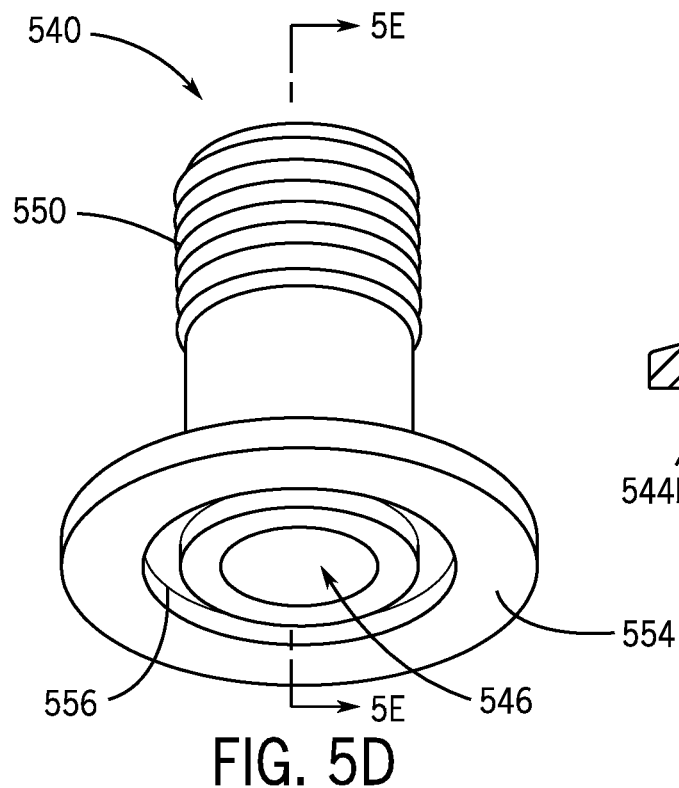
FIG. 5D depicts a perspective view of an example flange component of the salt sampling assembly of FIG. 5A.
Figure 5E:
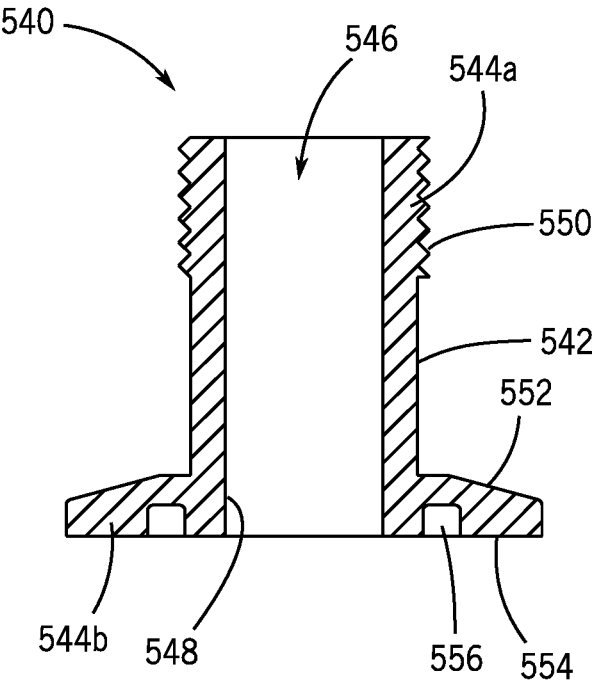
FIG. 5E depicts a cross-sectional view of the example flange component of FIG. 5D, taken along line 5E-5E of FIG. 5D.
Figure 7:
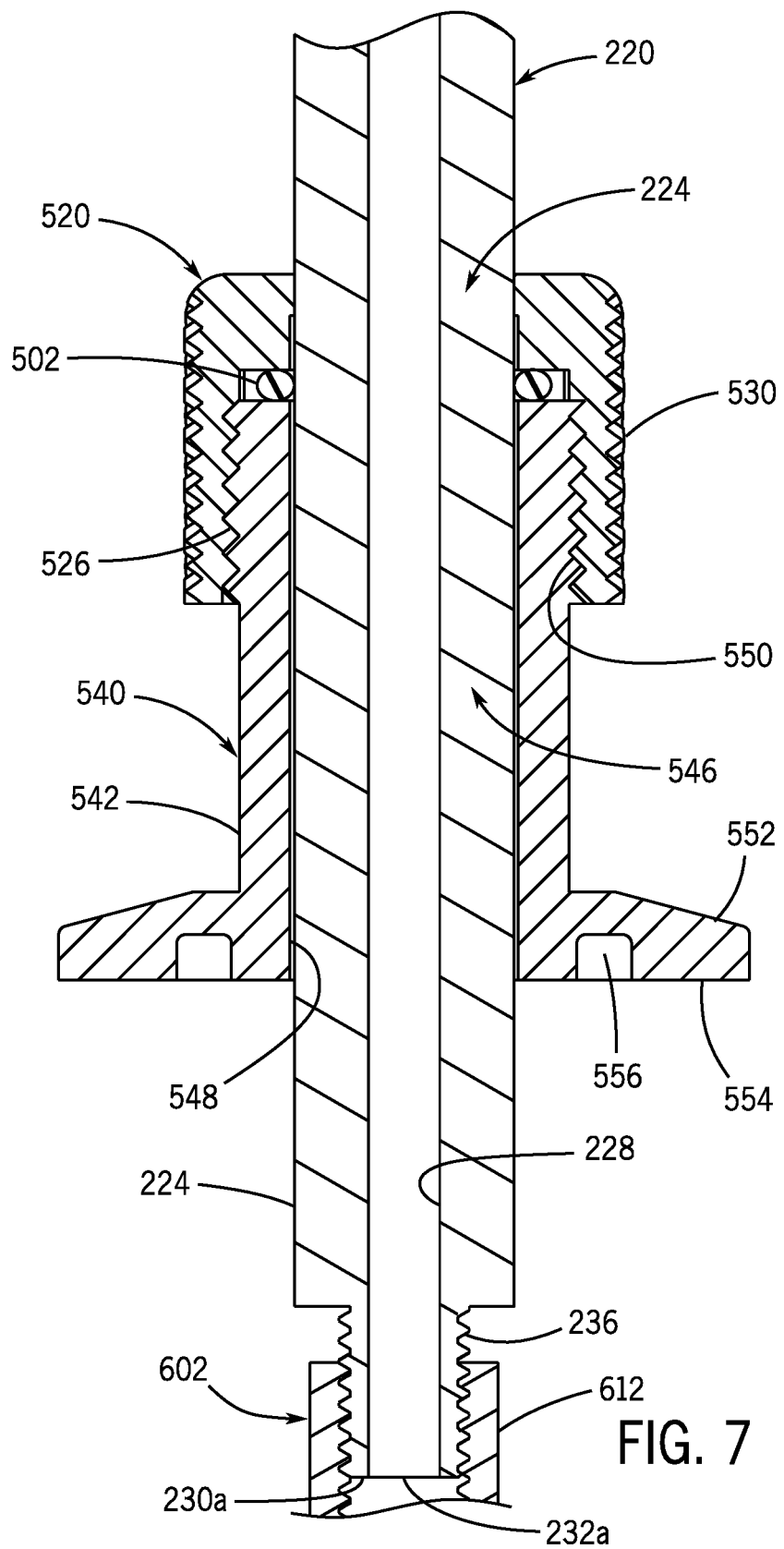
FIG. 7 depicts a cross-sectional view of the example salt sampling assembly of FIG. 3, taken along line 7-7 of FIG. 3.

In several embodiments, the flange component 520, as shown in FIGS. 5D and 5E, includes a flange component body 542, which defines a threaded portion 544a and a flange portion 544b. In at least one embodiment, the flange component body 542 also defines a flange component through portion 546 that extends through the flange component body 542, and also defines a flange interior surface 548. In many embodiments, the flange component body 542 includes a flange thread surface 550, a clamping surface 552, an engagement surface 554, and an O-ring slot 556. In one or more embodiments, the flange thread surface 550 are complementary to the threaded interior surface 526 of the knob component 520, such that the knob component 520 and the flange component 540 may be removably coupled, as shown in FIG. 7. In one embodiment, the engagement surface 554 and/or the clamping surface 552 may be utilized in in engaging with the interface assembly 280. In certain embodiments, the clamping surface 552 may be utilized to attach a clamp (such as, but not limited to, a first clamp 281), and thus, the interface assembly 280, to the flange component 540.

In various embodiments, the collection assembly 260 includes a top cell 602, a pin 620, a bottom cell 640, and an orifice 660. In at least one embodiment, the collection assembly 260 is inserted into the molten fuel salt and collects the salt sample. In several embodiments, as shown in FIGS. 6A-6F, the top cell 602 may define a top cell body 604 that further defines a top cell through portion 606 that extends through the top cell body 604. In many embodiments, the top cell through portion 606 may include a threaded region 606a, a constricted region 606b, and a holding region 606c. In at least one embodiment, the threaded region 606a may have a threaded interior surface 608. In one embodiment, the holding region 606c may have a holding region interior surface 610. In one or more embodiments, the top cell body 604 may also include an exterior stepped surface 612 and a threaded tip portion 614, wherein the threaded tip portion 614 has exterior threads 616.

In multiple embodiments, as shown in FIGS. 7, 8A and 8B, the threaded portion 236 of the elongated shaft 224 may removably couple with the threaded interior surface 608 of the threaded region 606a of the through portion 606.

In several embodiments, the pin 620 may include a pin body 622. In many embodiments, the pin body 622 may define an elongated portion 624 that defines a cylinder, a seating portion 626, the seating portion having a tapered surface 628 terminating at a tip 630, and a second end 632 opposite the tip 630.

In one or more embodiments, as shown in FIGS. 6E and 6F, the bottom cell 640 may include a bottom cell body 644. In at least one embodiment, the bottom cell body 644 may define a bottom cell through portion 646 that extends through the bottom cell body 644. In many embodiments, the bottom cell through portion 646 may include a threaded region 646a, a holding region 646b, and an orifice region 646c. In some embodiments, the bottom cell body 644 may also include a threaded interior surface 648 at the threaded region 646a of the through portion 646. In one embodiment, as shown in FIGS. 8A and 8B, the threaded interior surface 648 of the threaded region 646a of the bottom cell 640 may be removably coupled with the exterior threads 616 of the threaded tip portion 614 of the top cell 602. When the top cell 602 and the bottom cell 640 are coupled together, the holding region 606c of the through portion 606 of the top cell 602 and the holding region 646b of the through portion 646 of the bottom cell 640 are aligned, and the pin 620 is positioned within the aligned holding regions 646b and 606c. In some embodiments, the bottom cell body 644 also includes a holding region interior surface 650, a holding region bottom surface 652, a seating edge 654, an orifice region interior surface 656, a bottom cell exterior surface 658, and an orifice 660.

In many embodiments, as shown in FIGS. 8A and 8B, the guide component 282 defines the passage 285. In some embodiments, the passage 285 has a diameter that is larger than the outer diameter of the collection assembly 260 and the outer diameter of the elongated shaft 224, such that the collection assembly 260 can pass through the passage 285 of the guide component 282. For example, the collection assembly 260 may pass through a first end of the passage 285 of the guide component 282 that is connected to the second clamp 284, pass through the passage 285, and extend through the opposing end of the guide component 282 that is attached to the isolation component 290, such that the entirety of the collection assembly 260 extends through and out of the guide component 282. In this regard, the collection assembly 260 may be lowered through the passage 285, toward the process fluid of the molten salt system, in order to facilitate the collection of a sample. When collection of the sample is complete, the collection assembly 260 may be raised through the passage 285, away from the process fluid, such that the collection assembly 260 retains the sample and allows for the sample to be removed from the sampling system for subsequent analysis. The structural and dimensional relationship between the passage 285 and the collection assembly 260 may therefore allow for the consistent retrieval of a predictable sample volume (such as a sample volume of between 0.1 and 1 grams), while maintaining the safety enhancing qualities of the salt sampling system 200, as described herein.

In several embodiments, when the vacuum system 206 is utilized to draw a vacuum, the pin 620 raises (as depicted in FIG. 8B), and the vacuum drawn pulls a salt sample from the system (e.g., system 100), through the orifice 660 and into the holding region 646b. In at least one embodiment, the salt sample is about 0.1-1 gram, though the sample may be more or less than 0.1-1 gram, depending on the testing needs of the salt sample. In some embodiments, when the vacuum system 206 ceases drawing a vacuum, the pin 620 falls from the raised state and plugs the orifice 660 so that the salt sample does not fall out of the orifice 660 (as depicted in FIG. 8A). In one embodiment, the tapered surface 628 of the pin 620 plugs the seating edge 654 with the tip 630 positioned in the orifice region 646c when the vacuum system 206 is not drawing a vacuum on the system 200. Once the pin 620 plugs the orifice 660, the collection assembly 260 may be pulled up through the pipe 287b, through the isolation device 290, through the passage 285 of the guide component 282, through piping 287b, and through the seal component 240 until the collection assembly 260 is completely removed from the sampling system 200.

Turning to FIGS. 9A-9D, various views of individual components of another example collection assembly 260' are shown, according to one embodiment of the present disclosure. In various embodiments, each of the components of the collection assembly 260' may be substantially analogous to those described above with respect to the collection assembly 260. For example, collection assembly 260' includes a top cell 902 having a top cell body 904 and defining a top cell through portion 906, a threaded region 906a, a constricted region 906b, a holding region 906c, a threaded interior surface 908, a holding region interior surface 910, an exterior stepped surface 912, a threaded tip portion 914, and exterior threads 916, a bottom cell 940 having a bottom cell body 944 and defining a bottom cell through portion 946, a threaded region 946a, a holding region 946b, an orifice region 946c, a threaded interior surface 948, a holding region interior surface 950, a holding region bottom surface 952, a seating edge 954, an orifice region interior surface 956, a bottom cell exterior surface 958, and an orifice 960; redundant explanation of which is omitted herein for clarity. Notwithstanding the foregoing similarities, the collection assembly 260' does not include a pin (e.g., pin 620), and the orifice 960, seating edge 954, orifice region 946c, and orifice region interior surface 956 are positioned on a side of the bottom cell body 944, rather than at the bottom of the bottom cell body 644 of collection assembly 260.

In many embodiments, as shown in FIGS. 10A and 10B, the guide component 282 defines the passage 285. In some embodiments, the passage 285 has a diameter that is larger than the outer diameter of the collection assembly 260' and the outer diameter of the elongated shaft 224, such that the collection assembly 260' can pass through the passage 285 of the guide component 282. For example, the collection assembly 260' may pass through a first end of the passage 285 of the guide component 282 that is connected to the second clamp 284, pass through the passage 285, and extend through the opposing end of the guide component 282 that is attached to the isolation component 290, such that the entirety of the collection assembly 260' extends through and out of the guide component 282. In this regard, the collection assembly 260' may be lowered through the passage 285, toward the process fluid of the molten salt system, in order to facilitate the collection of a sample. When collection of the sample is complete, the collection assembly 260' may be raised through the passage 285, away from the process fluid, such that the collection assembly 260' retains the sample and allows for the sample to be removed from the sampling system for subsequent analysis. The structural and dimensional relationship between the passage 285 and the collection assembly 260 may therefore allow for the consistent retrieval of a predictable sample volume (such as a sample volume of between 0.1 and 1 grams), while maintaining the safety enhancing qualities of the salt sampling system 200, as described herein.

In some embodiments, as shown in FIGS. 10A and 10B, because the collection assembly 260' does not have a pin (e.g., pin 620), when the vacuum system 206 draws a vacuum on the holding region 946b, the vacuum system 206 pulls in the salt sample through the orifice 960 and the salt sample may either attach to the threaded region 946a of the through portion 946 of the bottom cell body 944, or may collect in the holding region 946b of the through portion 946 at the holding region bottom surface 952. In some embodiments, the salt sample is about 0.1-1 gram, though the collection assembly 260' may collect more or less salt sample, depending on the testing needs of the salt sample. Once the salt sample is collected in the collection assembly 260', the collection assembly 260' is pulled out of the molten salt, through the isolation component 290, through the guide component 282, and out of the seal assembly 240, such that the collection assembly 260' is completely removed from the system 200.

Turning to FIGS. 11A, 11B, and 12, perspective and side views of another example collection assembly 260" for use in a static system, according to one embodiment of the present disclosure. In one or more embodiments, the collection assembly 260" only includes bottom cell 1140. In various embodiments, bottom cell 1140 of the collection assembly 260" may be substantially analogous to bottom cell 640 and bottom cell 940 described above with respect to the collection assembly 260 and collection assembly 260'. For example, bottom cell 1140 has a bottom cell body 1144 and defines a bottom cell through portion 1146, a threaded region 1146a, a holding region 1146b, a threaded interior surface 1148, a holding region interior surface 1150, a holding region bottom surface 1152, and a bottom cell exterior surface 1158; redundant explanation of which is omitted herein for clarity. Notwithstanding the foregoing similarities, collection assembly 260" does not include a top cell (e.g., top cell 602), a pin (e.g., pin 620), an orifice (e.g., orifice 660), a seating edge (e.g., seating edge 654), an orifice region (e.g., orifice region 646c), or an orifice region interior surface (e.g., an orifice region interior surface 656), and the through portion 1146 does not extend all the way through the bottom cell body 1144.

In various embodiments, the bottom cell 1140 is the only component of collection assembly 260". In at least one embodiment, the threaded region 1146a of the through portion 1146 of the bottom cell body 1144 is removably coupled to the shaft threaded surface 236 of the threaded portion 234 of the first end 230a of the elongated shaft 224. In many embodiments, the collection assembly 260" is placed in the molten fuel salt to collect a salt sample without the use of the vacuum system 206. Instead, in some embodiments, the threaded surface 236 may act as a nucleation site for the salt sample to attach to, and the collection assembly 260" is pulled out of the interface assembly 280 to collect the salt sample. The collection assembly 260" may operate to collect salt by being placed into the molten fuel salt, whereby some molten fuel salt may adhere to the shaft threaded surface 236 of the elongated shaft 224, or may adhere to the bottom cell exterior surface 1158. In other embodiments, the collection assembly 260 may have additional features that create additional nucleation sites for the salt sample to adhere to. Once the collection assembly 260" has collected the salt sample, the collection assembly 260" may be raised out of the molten fuel salt, out through the isolation component 290, out through the passage 285 of the guide component 282, and out of the seal assembly 240, such that the collection assembly 260" is completely removed from the system 200.

In several embodiments, as shown in FIGS. 2A and 2B, the interface assembly 280 may include a first clamp 281, a second clamp 284, a third clamp, a guide component 282, piping 287a and 287b, an isolation component 290, and a handle 292. In some embodiments, the piping 287a and 287b may have a hollow interior such that the collection assembly 260 and the elongated shaft 224 can pass through the interior of the piping 287a and 287b. In one embodiment, the piping 287a and 287b may each have a first end and a second end, and may also have a flange or other type of connection device at the first end and/or the second end to connect the piping 287a and 287b to a clamp (e.g., clamp 281). In many embodiments, as shown in FIGS. 8A, 8B, 10A, 10B, and 12, the guide component 282 may include an interior passage wall 283 that defines a passage 285 that the collection assembly 260 and the elongated shaft elongated shaft 224, can pass through when collecting a salt sample.

In various embodiments, the isolation component 290 may be a valve or other type of device that can isolate the molten fuel salt from the system 200. In one or more embodiments, the isolation component 290 may be a ball valve, gate valve, globe valve, plug valve, check valve, butterfly valve, or any other type of valve. In at least one embodiment, the isolation component 290 has a hollow interior and valve components within the hollow interior. In some embodiments, the isolation component 290 may have an open position, in which the collection assembly 260 (connected to the elongated shaft 224) can pass through the interior of the isolation component 290, and a closed position, in which the collection assembly 260 is blocked from passing through the interior of the isolation component 290 by the valve components. In many embodiments, the handle 292 is attached to the isolation component 290, and is utilized to move the isolation component 290 from one position (e.g., the open position) to the other position (e.g., the closed position). As shown in FIGS. 2A and 2B, the handle 292 is a lever that can be pulled upwards and downwards to either open or close the isolation component 290. However, in other embodiments, depending on the type of valve the isolation component 290 is, the handle 292 may be a rotatable wheel or other type of lever, or the isolation component 290 may not include a handle 292.

In multiple embodiments, the first clamp 281 is removably coupled or fastened to the clamping surface 552 of the flange component 540 and one end of the piping 287a, such that the flange component through portion 546 of the flange component 540 and the hollow interior of the piping 287a are fluidically connected. In several embodiments, the second flange 284 is removably coupled or fastened to the other end of the piping 287a and the guide component 282, such that the hollow interior of the piping 287a and the passage 285 of the guide component 282 are fluidically connected. In many embodiments, the guide component 282 is fastened to the isolation component 290, and the passage 285 of the guide component and the interior of the isolation component 290 are fluidically connected when the isolation component 290 is in the open position. In at least one embodiment, the third clamp 286 is removably coupled or fastened to the isolation component 290 and one end of the piping 287b, such that the interior of the isolation component 290 and the hollow interior of the piping 287b are fluidically connected. In various embodiments, the piping 287b may be fluidically connected to the system or apparatus containing the molten fuel salt or process fluid.

Figure 13A:
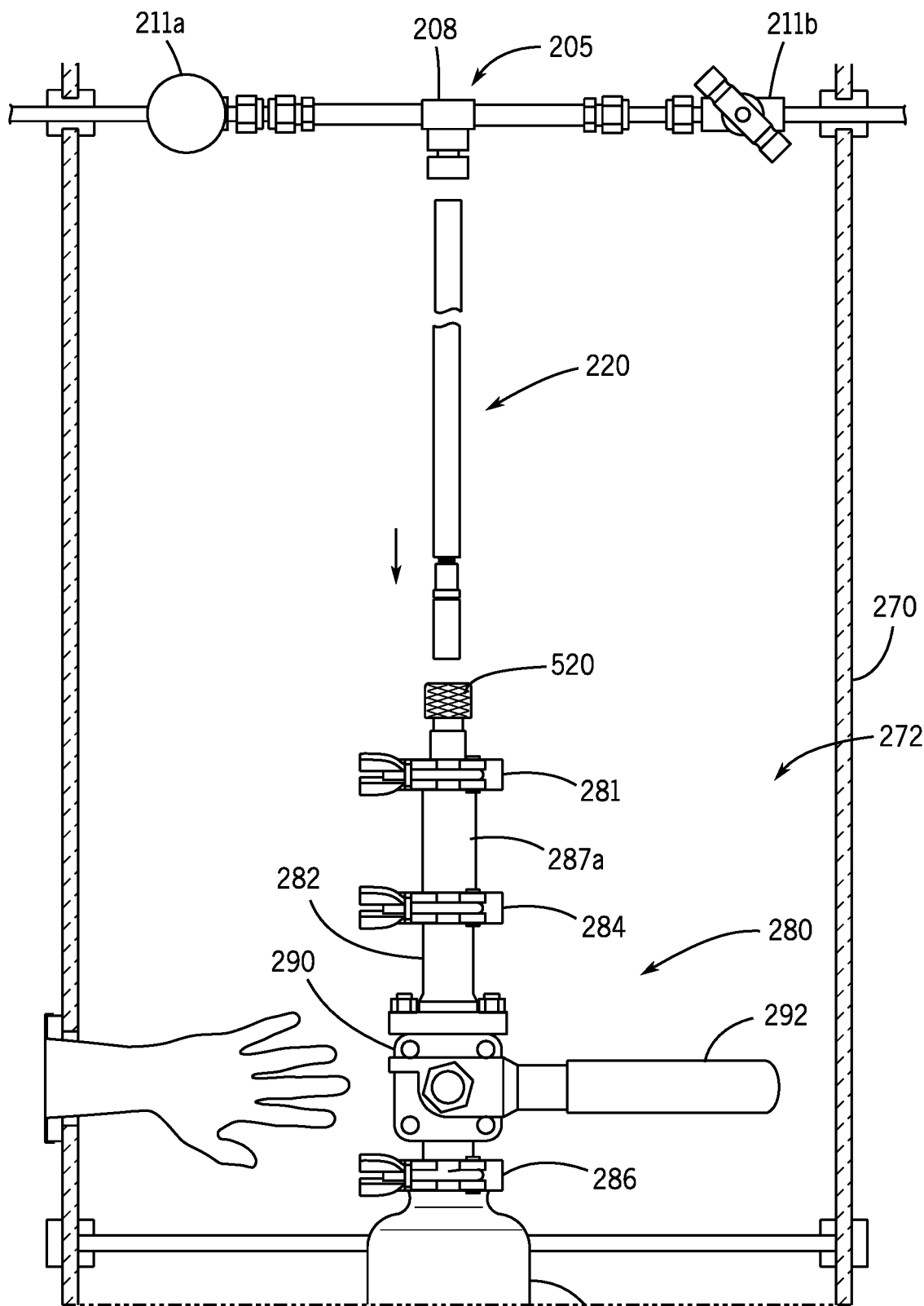
FIG. 13A depicts a front view of example salt sampling system of FIG. 2A in a first configuration.

Turning to FIGS. 13A-13D, various views of the example collection assembly 260 being inserted into the example interface assembly 280 are shown, according to one embodiment of the present disclosure. As shown in FIG. 13A, in one or more embodiments, flange component 540 of the sealing component 220 is connected to the interface assembly 280 by the first clamp 281. In at least one embodiment, the collection assembly 260 is to be placed through the flange component through portion 548 of the flange component 540 of the sealing component 220. In certain embodiments, the second end 230b of the elongated shaft 224 is inserted into the passage port 210 of the fitting 208 so that the elongated shaft 224 is fluidically connected to the fitting 208 and, thus, the cover gas system 207 and the vacuum system 206. In one embodiment, the isolation component 290 is in the closed position, so that the process fluid located in a process component 276 is isolated from the collection assembly 260.

Figure 13B:
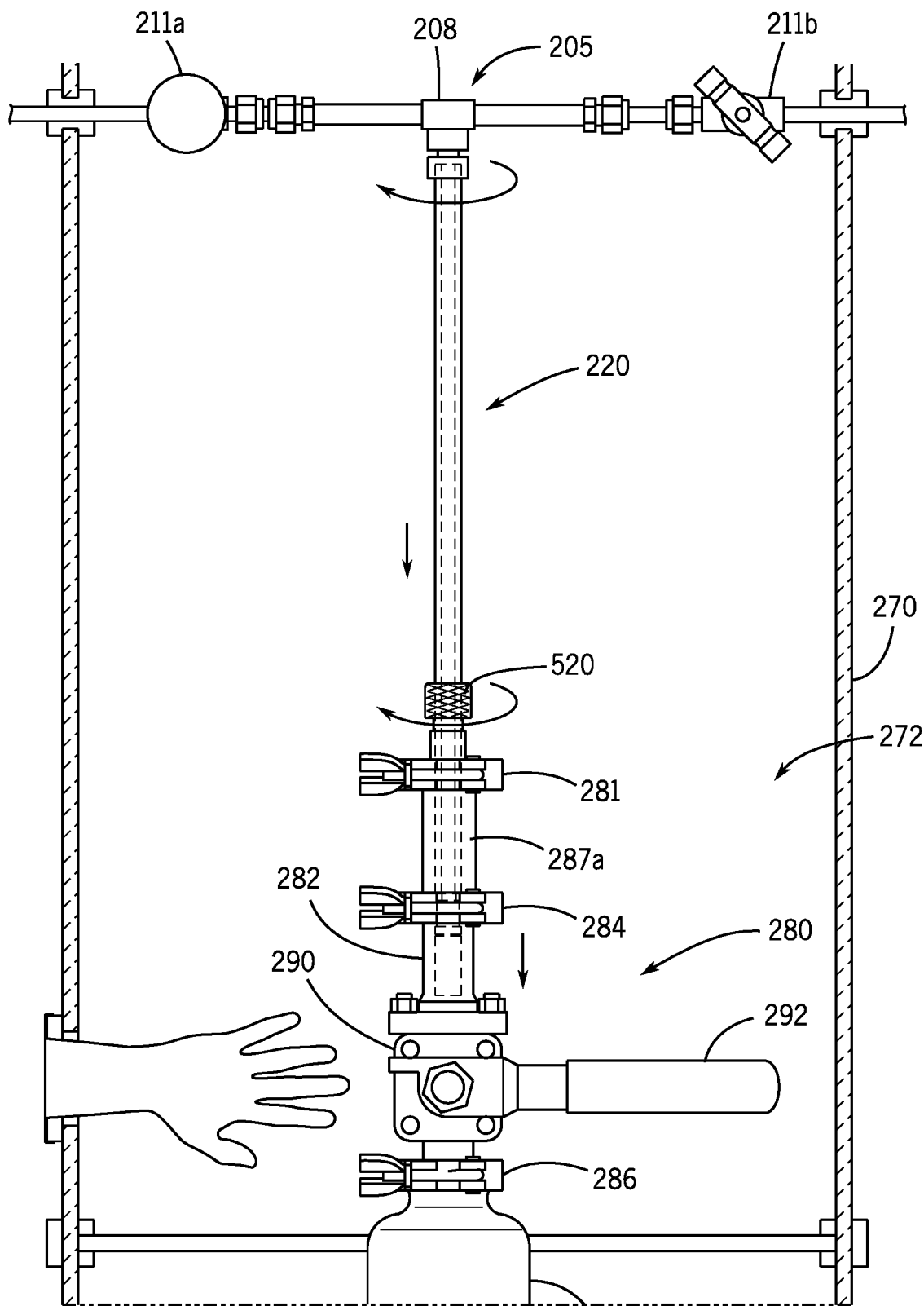
FIG. 13B depicts a front view of example salt sampling system of FIG. 2A in a second configuration.

In multiple embodiments, as shown in FIG. 13B, the collection assembly 260 is pushed into the flange component 540 and into the interface assembly 280. In many embodiments, the knob component 520 is tightened once the collection assembly 260 is positioned through the flange component 540, so that process fluid cannot seep out of the interface assembly 280 or flange component 540.

Figure 13C:
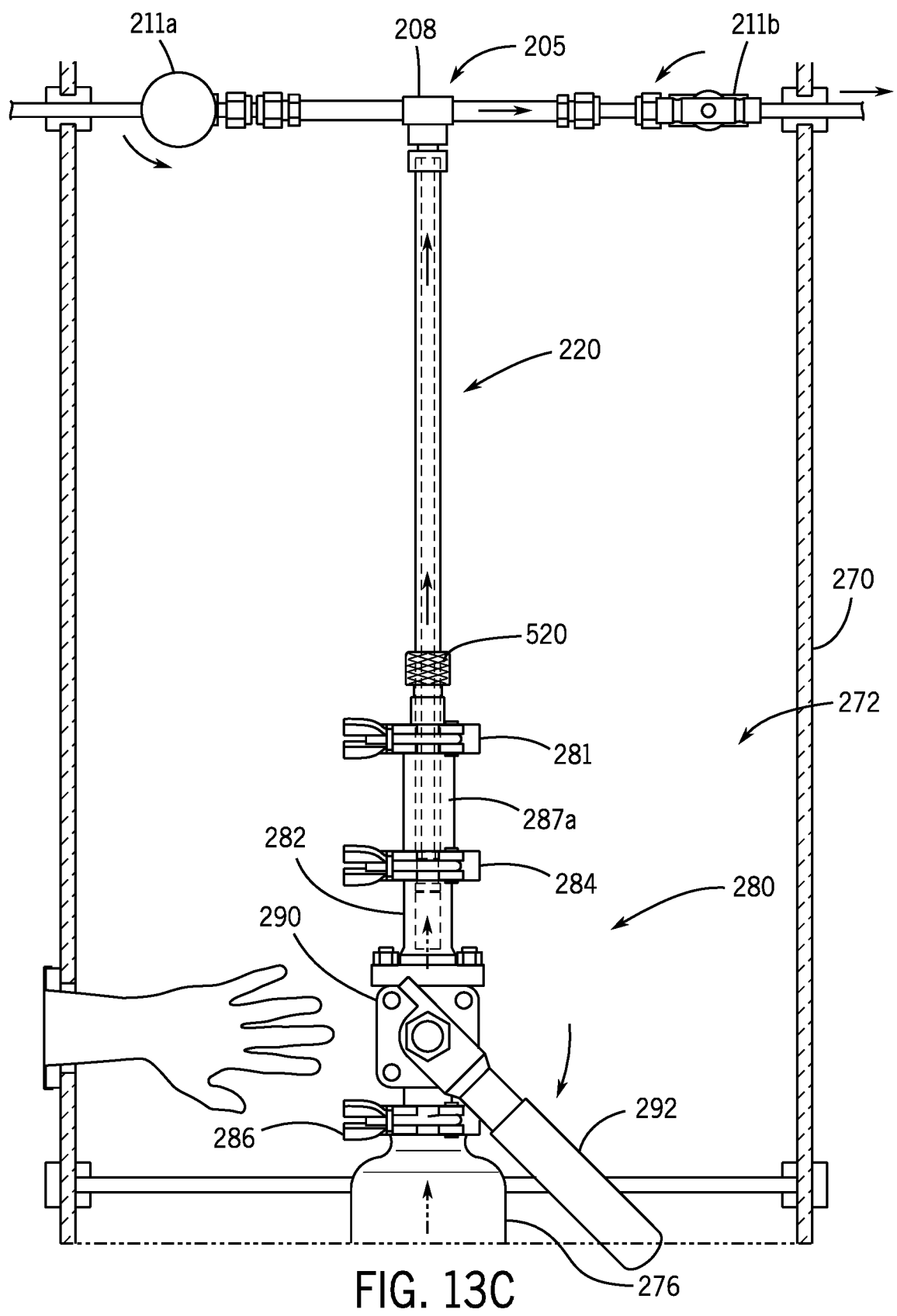
FIG. 13C depicts a front view of example salt sampling system of FIG. 2A in a third configuration.

In several embodiments, as shown in FIG. 13C, the handle 292 is moved, causing the isolation component 290 to be in the open position. In one or more embodiments, the collection assembly 260 is placed into the process component 276 to collect a sample of process fluid, and then raised back out of the process component 276 and interface assembly 280. In at least one embodiment, the cover gas system 207 is utilized by rotating the gas inlet valve 211a so that the cover gas is fluidically connected, and the cover gas purges the collection assembly 260. In one embodiment, the vacuum system 206 is utilized to draw a vacuum on the system by rotating the vacuum valve 211b into an open position so that the vacuum system 206 is fluidically connected.

Figure 13D:
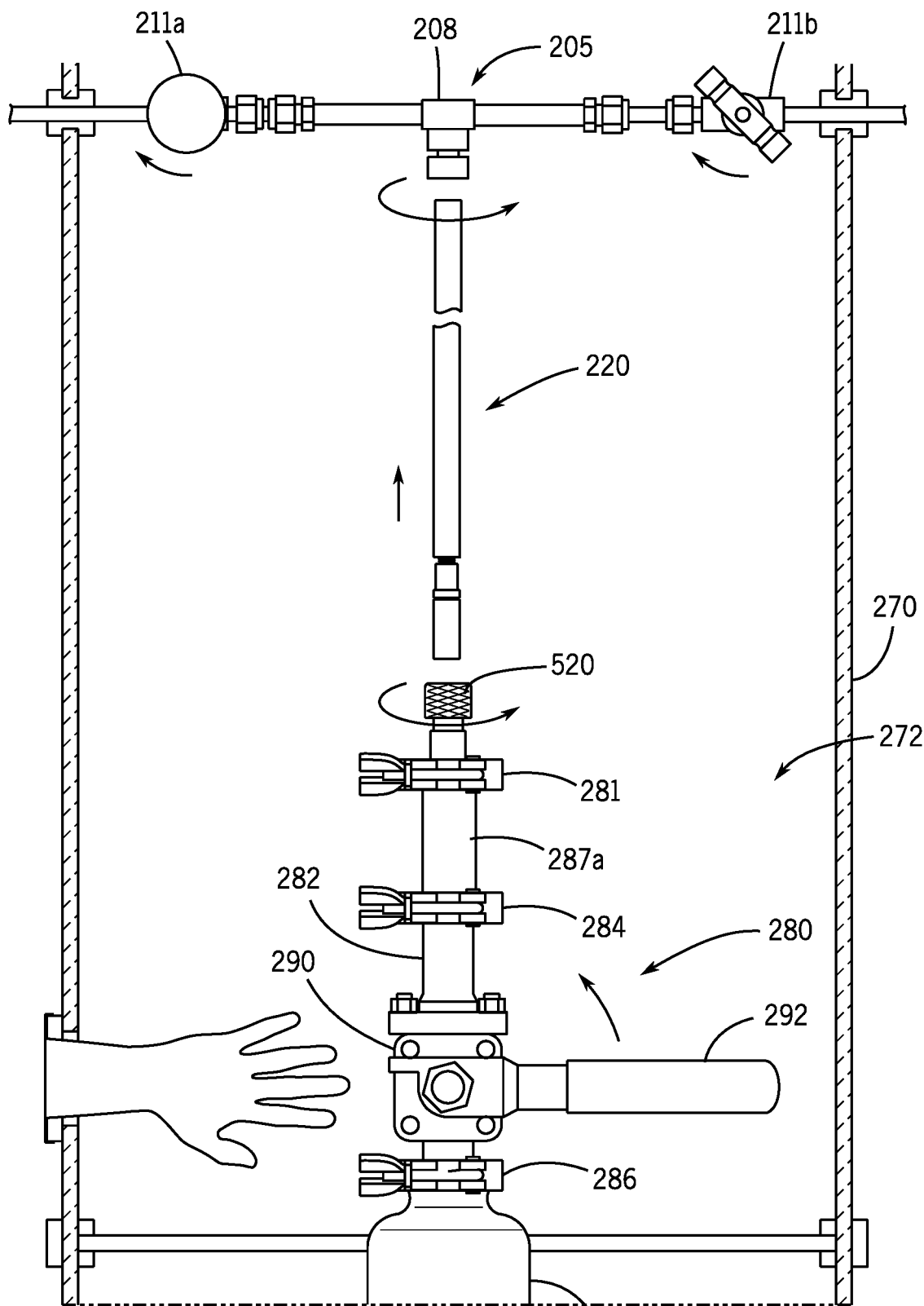
FIG. 13D depicts a front view of example salt sampling system of FIG. 2A in a fourth configuration.

In various embodiments, as shown in FIG. 13D, the collection assembly 260 is completely removed from the interface assembly 280, and the handle 292 is moved so that the isolation component 290 is in the closed position and isolating the process fluid from the rest of the salt sampling system 200. In some embodiments, the gas inlet valve 211a is rotated to a closed position, and the vacuum valve 211b is rotated into a closed position. In at least one embodiment, the second end 230b of the elongated shaft 224 is removed from the passage port 210 of the fitting 208 so that the process sample in the attached collection assembly 260 may be moved without being attached to the system 200.

Figure 14A:
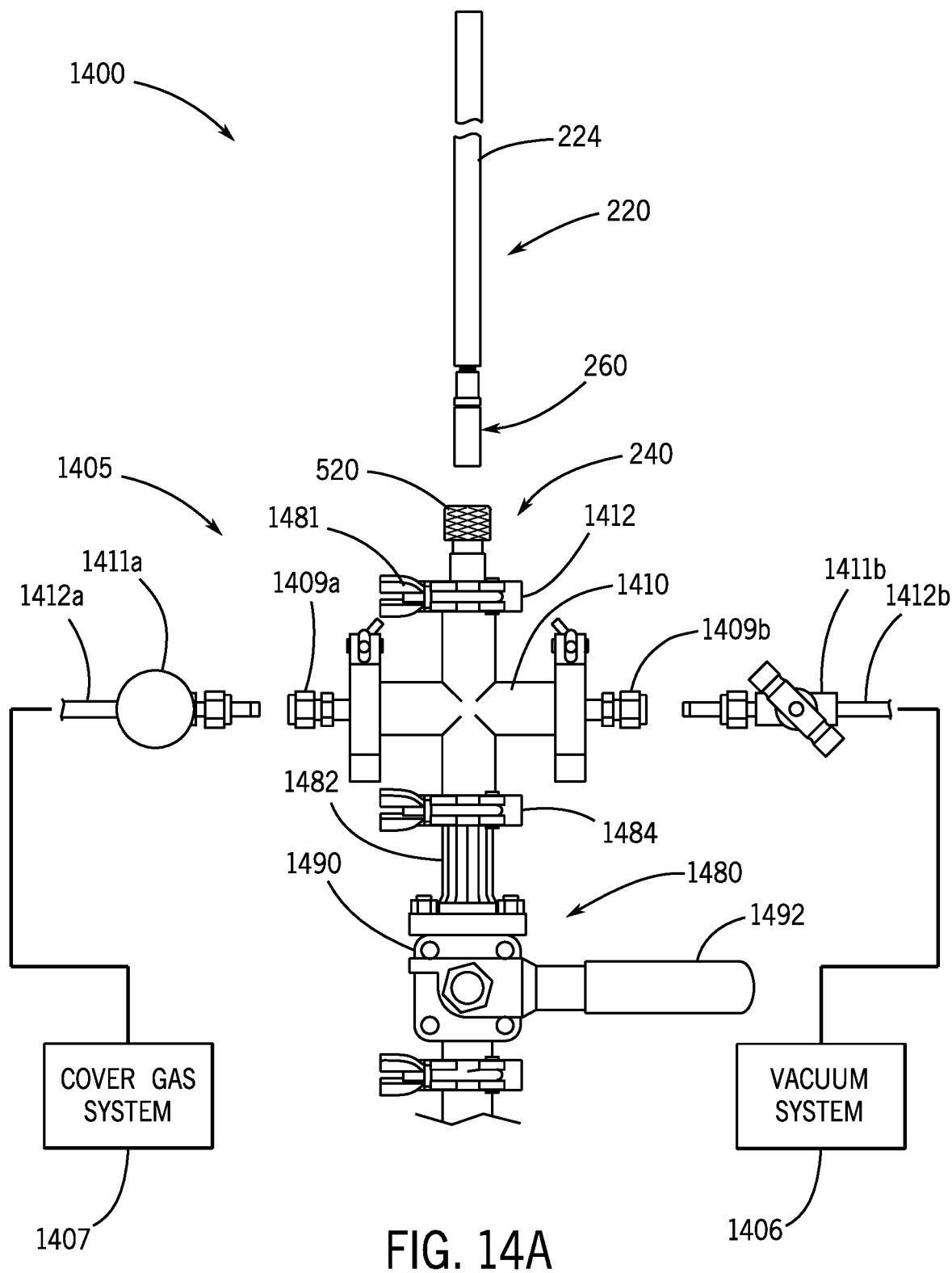
FIG. 14A depicts another example molten salt sampling system.
Figure 14B:
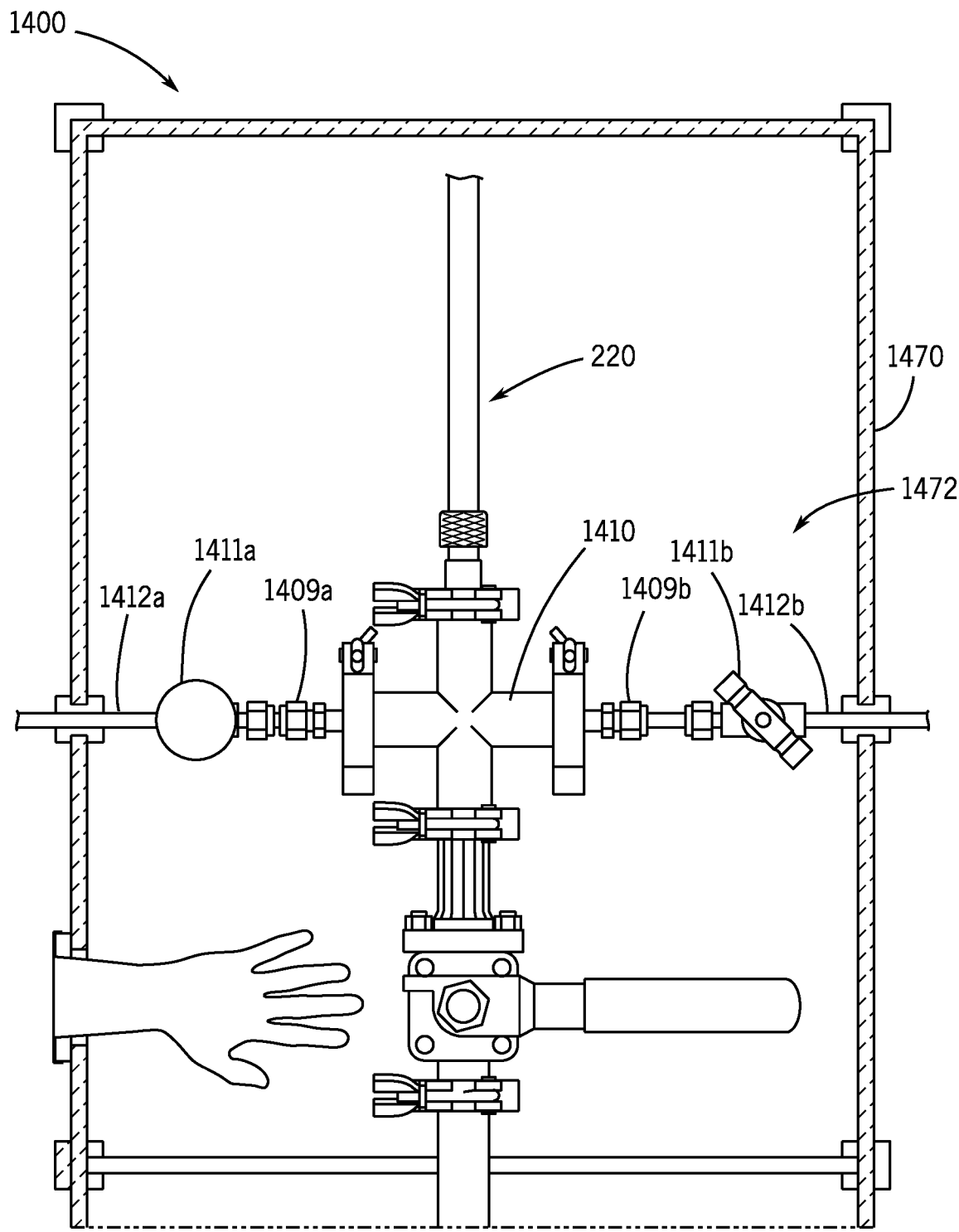
FIG. 14B depicts the example molten salt sampling system of FIG. 14A, including a containment structure.

Turning to FIGS. 14A and 14B, shown are front views of another example molten salt sampling system 1400, according to one embodiment of the present disclosure. As shown in FIGS. 14A and 14B, in one or more embodiments, each of the components of the system 1400 may be substantially analogous to those described above with respect to the system 200. For example, system 1400 includes a gas management system 1405 that includes a cover gas system 1407, a vacuum system 1406, a gas inlet port 1409a, a vacuum portion 1409b, a gas inlet valve 1411a, a vacuum valve 1411b, and tubing 1412a and 1412b, an interface assembly 1480 including a first clamp 1481, a second clamp 1484, a third clamp 1486, a guide component 1482, and an isolation device 1490 with handle 1492, and a salt sampling assembly 220 that includes an elongated shaft 224, a collection assembly 260, and a sealing component 240; redundant explanation of which is omitted herein for clarity. Notwithstanding the foregoing similarities, the gas management system 1405 includes a pipe cross 1410 having a port 1412 at each extension of the pipe cross 1410. In one embodiment, the salt sampling assembly 220 may be placed into a top port 1412 of the pipe cross 1410 and extended through the bottom port 1412 of the pipe cross 1410 and into the guide component 1482. As shown in FIG. 14B, in some embodiments, the system 1400 may be placed in a containment space 1472 within a containment structure 1470. In certain embodiments, the containment space 1472 may be an inert space so that the process fluid sample is not contaminated with any airborne reactants.

Figures 16A, 16B:
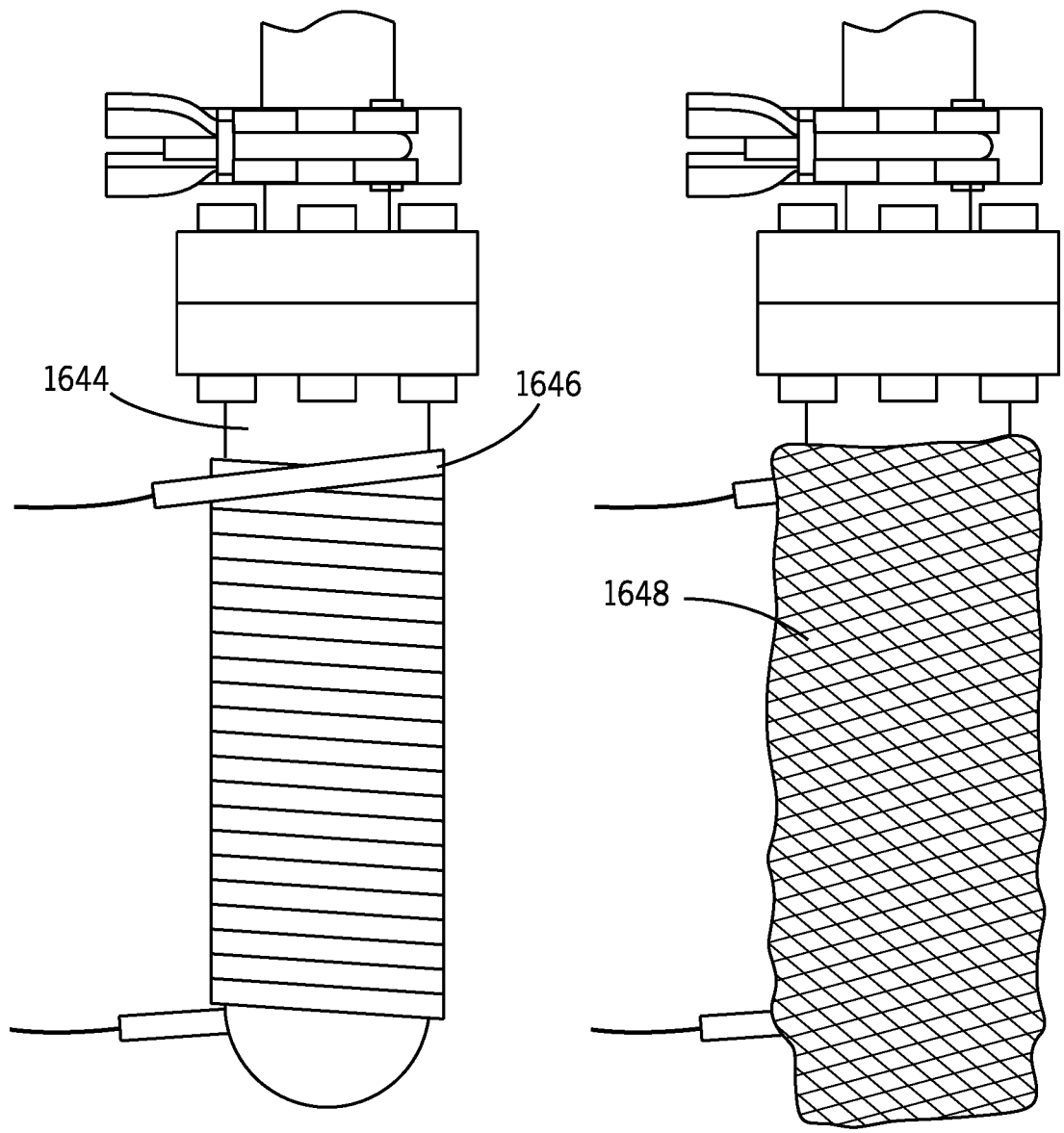
FIG. 16A depicts the crucible of FIG. 13 with high temperature heaters.
FIG. 16B depicts the crucible and high temperature heaters of FIG. 16A with insulation.
Figure 17:
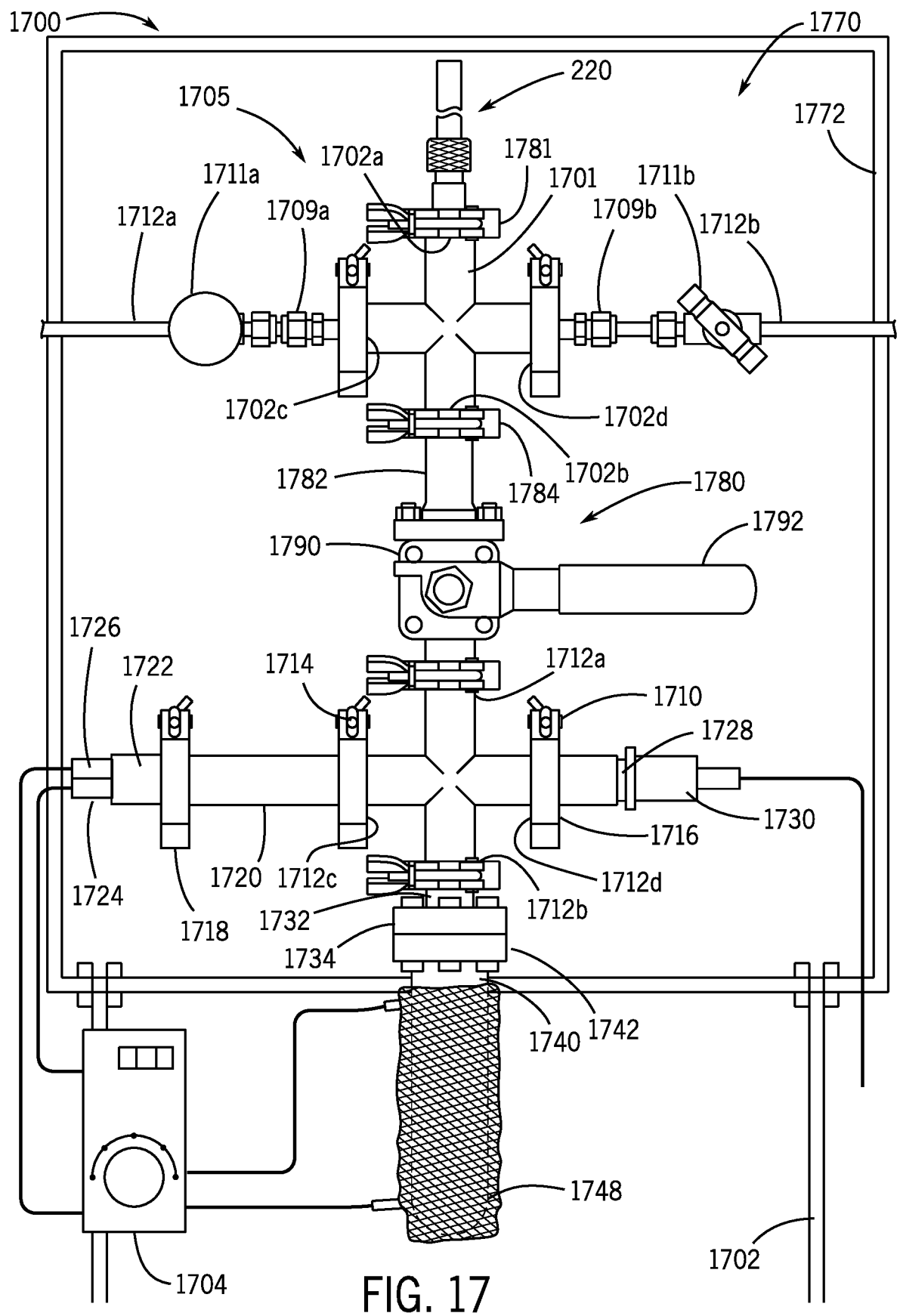
FIG. 17 depicts the example molten salt sampling system of FIG. 12 with a containment bag.

Turning to FIGS. 15, 16A, and 16B, another example molten salt sampling system 1600 is depicted, according to one embodiment of the present disclosure. In several embodiments, the system 1600 may not be connected to a system, such as system 100, but instead may be a laboratory sampling system. In many embodiments, each of the components of the system 1600 may be substantially analogous to those described above with respect to the system 200. For example, system 1600 includes a gas management system 1605 that includes a cover gas system 1607, a vacuum system 1606, a gas inlet port 1609a, a vacuum system 1606, a gas inlet port 1609a, a vacuum portion 1609b, a gas inlet valve 1611a, a vacuum valve 1611b, and tubing 1612a and 1612b, an interface assembly 1680 including a first clamp 1681, a second clamp 1684, a third clamp 1686, a guide component 1682, and an isolation device 1690 with handle 1692, and a salt sampling assembly 220 that includes an elongated shaft 224, a collection assembly 260, and a sealing component 240; redundant explanation of which is omitted herein for clarity.

Notwithstanding the foregoing similarities, system 1600 may include a first pipe cross 1601 instead of a fitting (e.g., fitting 208) that connects the vacuum system 1606 and the cover gas system 1607 to the rest of the system 1600. In many embodiments, the first pipe cross 1601 includes ports 1602a-d at each extension of pipe cross 1601. In some embodiments, first pipe cross 1601 may be attached at second clamp 1684 to the guide component 1682. In one or more embodiments, the system 1600 may also include a second pipe cross 1610 having a first port 1612a, a second port 1612b, a third port 1612c, and a fourth port 1612d. In several embodiments, the first port 1612a may be connected via third clamp 1686 to the isolation device 1690. In at least one embodiment the third port 1612c may be connected to an end of pipe 1620 via a fourth clamp 1614, and the other end of pipe 1620 may be connected to a first side instrument mount 1622 via a fifth clamp 1618. In some embodiments, the first side instrument mount 1622 may be connected to a first instrument 1624 and a second instrument 1626.

In various embodiments, the fourth port 1612d may be connected to a second side instrument mount 1628 via a sixth clamp 1616, and the second side instrument mount 1628 may be attached to a third instrument 1630. In many embodiments, each of the first instrument 1624, second instrument 1626, and third instrument 1630 may be thermocouples, pressure transducers, and/or an oxygen sensor, or any other sensor or instrument as may be utilized in the system 1600. In one embodiment, each of the three instruments 1624, 1626, and 1628 may be a different type of instrument.

In one or more embodiments, the second port 1612b may be connected to a crucible mount 1632, that is connected to a crucible mount flange 1634. The crucible mount flange 1634 may be removably coupled to a crucible flange 1642 that is connected to a crucible 1640. In many embodiments, the crucible 1640 may be a container that holds fuel salt or other process fluids, and is able to be heated to heat the fuel salt within.

As shown in FIGS. 16A and 16B, in various embodiments, the crucible 1640 may have an outer crucible surface 1644. In many embodiments, a heat wrap 1646 is placed on and around the crucible surface 1644, and an insulating blanket 1648 may be placed on and around the heat wrap

1646. In some embodiments, the heat wrap 1646 is operatively connected to a power control 1604 which controls how hot the heat wrap may become in order to heat the salt in the crucible. In one embodiment, the insulating blanket 1648 insulates the heat wrap 1646 and crucible 1640 from losing some heat energy that would otherwise be cooled by the environment around the crucible 1640. As shown in FIG. 15, the power control 1604 may be attached or mounted to a support structure 1602

In multiple embodiments, the seal component 240 is connected to the first pipe cross 1601 at a port 1602a via first clamp 1681. In many embodiments, the collection assembly 260 and elongated shaft 224 are placed into the sealing component 240, through the first pipe cross 1601, through the second clamp 1684 and through the guide component 1682. In some embodiments, the collection assembly 260 may be placed through the isolation component 1690 once the isolation component 1690 is put in an open position. Thereafter, the collection assembly 260 is placed through the third clamp 1686 and into the second pipe cross 1610 at port 1612a, and into the crucible 1640. The cover gas system 1607 and vacuum system 1606 may be utilized and the salt sample may be collected into the collection assembly. Thereafter, the collection assembly is removed from the interface assembly 1680 and the isolation device 1690 is moved back into a closed position to isolate the salt or process fluid from the collection assembly 260 and other parts of the system 1600.

Turning to FIG. 17, another example molten salt sampling system 1700 is depicted, according to one embodiment of the present disclosure. In several embodiments, the system 1700 may not be connected to a system, such as system 100, but instead may be located in an inert containment structure 1702. In many embodiments, each of the components of the system 1700 may be substantially analogous to those described above with respect to the system 200. For example, system 1700 includes a gas management system 1705 that includes a cover gas system 1707, a vacuum system 1706, a first pipe cross 1701 with ports 1702a-d, a gas inlet port 1709a, a vacuum portion 1709b, a gas inlet valve 1711a, a vacuum valve 1711b, and tubing 1712a and 1712b, an interface assembly 1780 including a first clamp 1781, a second clamp 1784, a third clamp 1786, a guide component 1782, and an isolation device 1790 with handle 1792, and a salt sampling assembly 220 that includes an elongated shaft 224, a collection assembly 260, and a sealing component 240, a second pipe cross 1710 with ports 1712a-d, clamps 1714, 1716, and 1718, a pipe 1720, a first side instrument mount 1722, a first instrument 1724, a second instrument 1726, a second side instrument 1728, a third instrument 1730, crucible 1740 having a crucible surface 1744, a crucible flange 1742, a crucible mount 1732, a crucible mount flange 1734, heat wrap 1746, insulating blanked 1748, and power control 1704; redundant explanation of which is omitted herein for clarity.

Notwithstanding the foregoing similarities, system 1700 may be within the containment structure 1702 that allows for an inert space within the containment structure for the salt sampling experiment. The power control 1704 may also be mounted on the outside of the containment structure 1702. In one embodiment, the containment structure 1702 may be a containment bag, such as a plastic bag that is fit over the system 1700, and a vacuum system may be connected to the inside of the containment bag such that the space within the bag is inert.

Figure 18:
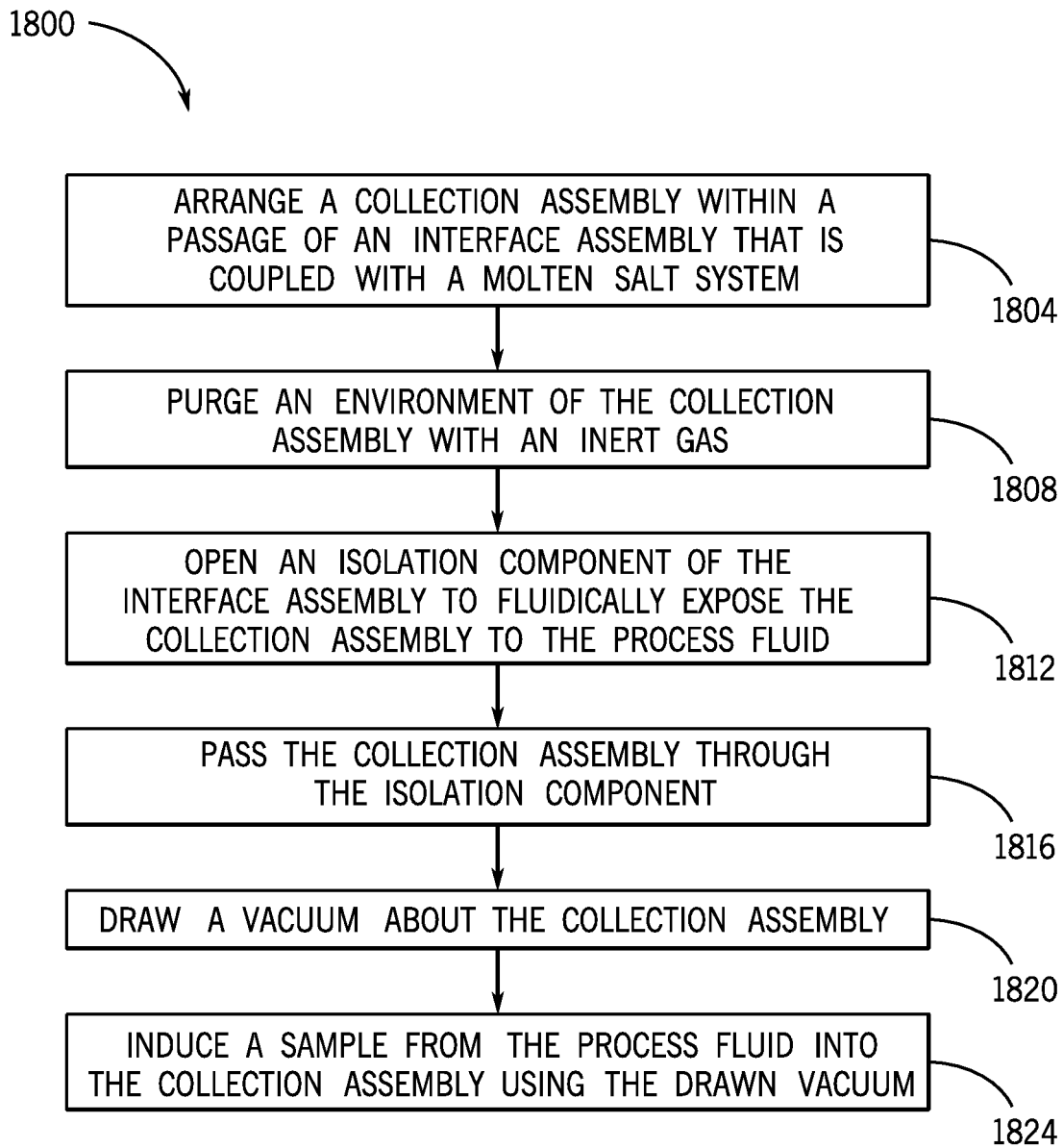
FIG. 18 depicts a flow diagram of an example method of salt sampling.

Now turning to FIG. 18, an example method 1800 of salt sampling is described, according to one embodiment of the present disclosure. In various embodiments, at step 1804, a collection assembly (e.g., collection assembly 260) is arranged within a passage of an interface assembly (e.g., interface assembly 280) that is coupled with a molten salt system.

At step 1808, in one or more embodiments, the environment of the collection assembly is purged with an inert gas. In some embodiments, the cover gas system 207 may pump a cover gas (inert gas) into the collection assembly to purge any air or other gases from the collection assembly. In particular, the molecular components of air can chemically react with molten fuel salt and produce unwanted byproducts, which can cause the molten fuel salt to degrade and require replacement nuclear fuel salt, which is expensive and hard to obtain. Thus, purging the air from the collection assembly helps preserve the molten fuel salt and protect the longevity of the molten salt system.

At step 1812, in many embodiments, an isolation component (e.g., isolation component 290) of the interface assembly is opened (e.g., put in the open position) to fluidically expose the collection assembly to the process fluid (e.g., molten fuel salt).

At step 1816, in some embodiments, the collection assembly is passed through the isolation component. Since the collection assembly is coupled to an elongated shaft (e.g., elongated shaft 224), a portion of the elongated shaft 224 may also pass through the isolation component. In one embodiment, the collection assembly is pushed towards the process fluid.

At step 1820, in at least one embodiment, a vacuum is drawn about the collection assembly by a gas management system (e.g., gas management system 205). In certain embodiments, the gas management system is fluidically coupled with the collection assembly via the elongated shaft. In one embodiment, the gas management system may utilize the vacuum system to draw the vacuum on the collection assembly.

At step 1824, in many embodiments, the drawn vacuum may pull or induce a sample from the process fluid into the collection assembly via an orifice (e.g., orifice 660). In some embodiments, if the collection assembly is collection assembly 260, the vacuum may unseat a pin (e.g., pin 620) from the orifice within the collection assembly prior to inducing the sample into the collection assembly. In many embodiments, if the collection assembly is collection assembly 260', there is no pin to unseat, and thus the drawn vacuum may cause a sample of process fluid to enter the collection assembly via the orifice.

In at least one embodiment, once the process fluid has entered the collection assembly, if the collection assembly is collection assembly 260 or another similar embodiment, the vacuum may be stopped by the gas management system, causing the pin to seat in the orifice of the collection assembly, plugging the orifice so that the process fluid sample cannot leak out of the collection assembly. In one embodiment, the vacuum may not be stopped, so that the process fluid sample does not leak from the collection assembly.

In several embodiments, once the process fluid sample has been collected in the collection assembly, the collection assembly may be raised from the interface assembly and the isolation component is closed, to fluidically isolate the collection assembly from the process fluid. In many embodiments, the collection assembly may then be completely removed from the interface assembly. In some embodiments, the collection assembly with the process fluid sample may remain in an inert environment for testing purposes.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A salt sampling system comprising
a salt sampling assembly including an elongated shaft and a collection assembly arranged at a first end of the elongated shaft;
an interface assembly engaged with the salt sampling assembly and fluidly coupled with a process fluid of a molten salt system and including
a guide component defining a passage configured to receive the elongated shaft and the collection assembly therethrough, and
an isolation component configured to reversibly isolate the passage from the molten salt system; and
a gas management system fluidly coupled with the salt sampling assembly and the interface assembly and configured to: (i) deliver a supply of an inert gas to the collection assembly, and (ii) draw a vacuum about an environment of the collection assembly.

2. The system of claim 1, wherein
the elongated shaft defines a hollow central portion extending from a first opening at the first end of the elongated shaft to a second opening at a second end of the elongated shaft.

3. The system of claim 2, wherein
the collection assembly comprises a bottom cell that defines an internal sample holding region and an orifice extending between the interior sample holding region and the environment of the collection assembly, the orifice configured to receive the sample from the process fluid and route the sample to the internal sample holding region, and
the gas management system is configured to draw the vacuum from the internal sample holding region to induce the sample into the collection assembly using the vacuum drawn from the collection assembly.

4. The system of claim 1, wherein
the salt sampling assembly comprises a seal assembly engaged with the guide component and configured to define a seal between the guide component and the elongated shaft; and the seal assembly comprises
a flange component having a flange through portion, the flange component mounted to the guide component with the flange through portion aligned with the passage such that the elongated shaft extends therethrough,
a multi-material sealing component defining a ring about the flange through portion and having the elongated shaft extending therethrough, and
a knob component having a knob through portion, the knob component coupled to the flange component with the knob component through portion aligned with the flange through portion and the ring, the knob component operable to tighten the multi-material sealing component against the flange component to define and maintain the seal.

5. The system of claim 1, wherein the interface assembly comprises
a gas inlet port fluidly coupled with the passage and configured to route the inert gas to the passage, and
a vacuum port fluidly coupled with the passage and configured to route the vacuum to the passage.

6. The system of claim 1, further comprising a containment structure encompassing at least the salt sampling assembly and defining an inert environment therein.

7. A method of salt sampling, the method comprising
arranging a collection assembly within a passage of an interface assembly, the interface assembly fluidly coupled with a process fluid of a molten salt system;
purging an environment of the collection assembly in the passage with an inert gas;
opening an isolation component of the interface assembly to fluidically expose the collection assembly to the process fluid;
passing the collection assembly through the isolation component by pushing the collection assembly toward the process fluid using an elongated shaft that has a shaft end coupled to the collection assembly; and
drawing a vacuum about the collection assembly by operating a gas management system that is fluidly coupled with the collection assembly via the elongated shaft, wherein the drawn vacuum induces a sample from the process fluid into the collection assembly.

8. The method of claim 7, further comprising, in response to drawing the vacuum, unseating a pin of the collection assembly from an orifice of the collection assembly and allowing the sample to enter the collection assembly, via the orifice.

9. The method of claim 8, further comprising ceasing the vacuum and causing the pin to sit in the orifice of the collection assembly, thereby plugging the orifice.

10. The method of claim 9, further comprising
raising the collection assembly from the interface assembly, and
closing the isolation component to fluidically isolate the collection assembly from the process fluid.

11. The method of claim 10, further comprising
removing the collection assembly including the sample from the interface assembly, and
maintaining the collection assembly and sample in an inert environment.

* * * * *